US010229546B2

United States Patent
Murata et al.

(10) Patent No.: US 10,229,546 B2
(45) Date of Patent: Mar. 12, 2019

(54) REMOTE SERVER

(71) Applicant: YANMAR CO., LTD., Osaka-shi (JP)

(72) Inventors: Sosuke Murata, Osaka (JP); Akihiro Shinkuma, Osaka (JP); Minoru Koyama, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 101 days.

(21) Appl. No.: 15/517,091

(22) PCT Filed: Aug. 31, 2015

(86) PCT No.: PCT/JP2015/074577
§ 371 (c)(1),
(2) Date: Apr. 5, 2017

(87) PCT Pub. No.: WO2016/056323
PCT Pub. Date: Apr. 14, 2016

(65) Prior Publication Data
US 2017/0301151 A1 Oct. 19, 2017

(30) Foreign Application Priority Data
Oct. 7, 2014 (JP) ................................. 2014-206685

(51) Int. Cl.
*G07C 5/08* (2006.01)
*G07C 5/00* (2006.01)
(Continued)

(52) U.S. Cl.
CPC ............ *G07C 5/008* (2013.01); *E02F 9/2054* (2013.01); *E02F 9/22* (2013.01); *G06Q 50/10* (2013.01);
(Continued)

(58) Field of Classification Search
CPC ...... G07C 5/008; G07C 5/0816; G07C 5/006; E02F 9/2054; H04M 11/00
(Continued)

(56) References Cited

U.S. PATENT DOCUMENTS

| 6,879,894 B1 * | 4/2005 | Lightner | ................ G07C 5/008 |
| | | | 701/31.4 |
| 9,697,503 B1 * | 7/2017 | Penilla | .................. G06Q 10/20 |

(Continued)

FOREIGN PATENT DOCUMENTS

| JP | 2002-121775 | 4/2002 |
| JP | 2002-188183 A | 7/2002 |
| JP | 4349477 B2 | 10/2009 |

OTHER PUBLICATIONS

International Search Report dated Oct. 13, 2015, issued for PCT/JP2015/074577.

*Primary Examiner* — Thomas G Black
*Assistant Examiner* — Wae L Louie
(74) *Attorney, Agent, or Firm* — Norton Rose Fulbright US LLP

(57) ABSTRACT

A remote server identifies based on unique identification information, model information, operator name information and/or owner name information, and a plurality of pieces of contact information. The remote server identifies trouble content information, estimated cause information, and seriousness information based on trouble content identification information. The remote server simultaneously transmits transmission information to contact addresses indicated by the plurality of pieces of contact information identified, the transmission information including the model information, the operator name information and/or the owner name information, date and time information, position information, the trouble content information, the estimated cause information, and the seriousness information. When the (Continued)

seriousness information has a highest rank, the remote server adds instruction information instructing a phone call to the operator and/or the owner to the transmission information to be transmitted to the contact addresses indicated by the plurality of pieces of contact information.

2 Claims, 25 Drawing Sheets

(51) Int. Cl.
| | | |
|---|---|---|
| *E02F 9/22* | (2006.01) | |
| *G06Q 50/10* | (2012.01) | |
| *G08B 25/00* | (2006.01) | |
| *H04M 11/00* | (2006.01) | |
| *E02F 9/20* | (2006.01) | |

(52) U.S. Cl.
CPC ............ *G07C 5/006* (2013.01); *G07C 5/0816* (2013.01); *G08B 25/00* (2013.01); *H04M 11/00* (2013.01)

(58) Field of Classification Search
USPC .......................................................... 701/31
See application file for complete search history.

(56) References Cited

U.S. PATENT DOCUMENTS

| | | | |
|---|---|---|---|
| 2002/0045986 A1* | 4/2002 | Tamaru | E01C 19/00 701/482 |
| 2002/0059320 A1* | 5/2002 | Tamaru | E01C 19/00 |
| 2008/0084332 A1* | 4/2008 | Ritter | G06Q 10/06 340/989 |
| 2008/0086497 A1* | 4/2008 | Wallace | G06Q 10/00 |
| 2017/0301151 A1* | 10/2017 | Murata | E02F 9/22 |
| 2017/0301152 A1* | 10/2017 | Murata | G06F 13/00 |

* cited by examiner

FIG.6

| LD | | IV | | CD | DTa | DTb | MM | SD |
|---|---|---|---|---|---|---|---|---|
| POSITION INFORMATION | | EVENT INFORMATION | | TROUBLE CONTENT IDENTIFICATION INFORMATION | DETECTED DATE AND TIME INFORMATION | TRANSMITTED DATE AND TIME INFORMATION | TROUBLESHOOTING MANUAL RELATED INFORMATION | MACHINE IDENTIFICATION INFORMATION |
| LATITUDE | LONGITUDE | LOCATION | | | | | | |
| N043426133 | E141568373 | ..., Z TOWN, Y CITY, X PREFECTURE | | E01 | 2014/08/01 12:35:40 | 2014/08/01 12:35:45 | ADD COOLING WATER | 111-222-333 |
| .... | .... | .... | | .... | .... | .... | .... | .... |

| SD | MD | | NMa | NMb | A PLURALITY OF PIECES OF CONTACT INFORMATION | | | |
|---|---|---|---|---|---|---|---|---|
| MACHINE IDENTIFICATION INFORMATION | MODEL INFORMATION | | OPERATOR NAME INFORMATION | OWNER NAME INFORMATION | CN(1) | CN(2) | CN(3) | CN(4) |
| TERMINAL PHONE NUMBER | MODEL CODE | MODEL NAME | | | NAME OF SALES PERSON | NAME OF SALES PERSON'S SUPERIOR | NAME OF SERVICE PERSON | NAME OF SERVICE PERSON'S SUPERIOR |
| | | | | | EMAIL ADDRESS | EMAIL ADDRESS | EMAIL ADDRESS | EMAIL ADDRESS |
| 111-222-333 | XXXX | AA-123 | AAA | BBB | ○△□ | ○△× | ◆□ | ◆○ |
| | | | | | 111@XXXX.com | 222@XXXX.com | 333@XXXX.com | 444@XXXX.com |
| 444-555-666 | YYYY | BB-456 | CCC | DDD | ○△◎ | ○△× | ◆◎ | ◆○ |
| | | | | | 555@YYYY.com | 222@YYYY.com | 666@YYYY.com | 444@YYYY.com |
| .... | .... | .... | .... | .... | .... | .... | .... | .... |

| TROUBLE CONTENT IDENTIFICATION INFORMATION | TROUBLE CONTENT INFORMATION | ESTIMATED CAUSE INFORMATION | SERIOUSNESS INFORMATION |
|---|---|---|---|
| ERROR CODE | | | |
| E01 | ENGINE COOLING WATER TEMPERATURE RISING WARNING | COOLING WATER MIGHT BE IN SHORTAGE | B |
| E02 | ENGINE FUEL TEMPERATURE RISING WARNING | ENGINE MIGHT BE FAILED | A |
| E03 | DEPTH SETTING DIAL ABNORMALITY | SENSOR MIGHT BE FAILED | C |
| E99 | ABNORMALITY OF MOVEMENT RANGE EXCEEDING MOVEMENT LIMITATION RANGE | AUTO THEFT MIGHT HAVE OCCURRED | A |
| ⋮ | ⋮ | ⋮ | ⋮ |

CD — AD — FD — ED

FIG.12B (SERVICE PERSON) CN(3)     TD    G(3)

| | |
|---|---|
| MD → MODEL CODE | XXXX |
| MODEL NAME | AA-123 |
| NMa → OPERATOR NAME | AAA |
| NMb → OWNER NAME | BBB |
| DTa → DETECTED DATE AND TIME | 2014/08/01 12:35:40 |
| DTb → TRANSMITTED DATE AND TIME | 2014/08/01 12:35:45 |
| LD → POSITION INFORMATION LATITUDE | N043426133 |
| LONGITUDE | E141568373 |
| LOCATION | ···, Z TOWN, Y CITY, X PREFECTURE |
| AD → TROUBLE CONTENT | ABNORMALITY OF MOVEMENT RANGE EXCEEDING MOVEMENT LIMITATION RANGE |
| FD → ESTIMATED CAUSE | AUTO THEFT MIGHT HAVE OCCURRED |
| ED → SERIOUSNESS | A |
| AC → ACCESS INFORMATION | HTTP://ABC/DEF/003/20140801/12:35:50 |
| INSTRUCTION INFORMATION | CALL OPERATOR AND OWNER ← AS |
| MM → TROUBLESHOOTING MANUAL | |
| RELATED INFORMATION | CHECK WHETHER AGRICULTURAL MACHINE IS NOT STOLEN |

FIG.12C (SALES PERSON) CN(1)     TD    G(1)

| | |
|---|---|
| MD → MODEL CODE | XXXX |
| MODEL NAME | AA-123 |
| NMa → OPERATOR NAME | AAA |
| NMb → OWNER NAME | BBB |
| DTa → DETECTED DATE AND TIME | 2014/08/01 12:35:40 |
| DTb → TRANSMITTED DATE AND TIME | 2014/08/01 12:35:45 |
| LD → POSITION INFORMATION LATITUDE | N043426133 |
| LONGITUDE | E141568373 |
| LOCATION | ···, Z TOWN, Y CITY, X PREFECTURE |
| AD → TROUBLE CONTENT | ABNORMALITY OF MOVEMENT RANGE EXCEEDING MOVEMENT LIMITATION RANGE |
| FD → ESTIMATED CAUSE | AUTO THEFT MIGHT HAVE OCCURRED |
| ED → SERIOUSNESS | A |
| AC → ACCESS INFORMATION | HTTP://ABC/DEF/001/20140801/12:35:50 |
| INSTRUCTION INFORMATION | CALL OPERATOR AND OWNER ← AS |
| MM → TROUBLESHOOTING MANUAL | |
| RELATED INFORMATION | CHECK WHETHER AGRICULTURAL MACHINE IS NOT STOLEN |

FIG.12D (SALES PERSON'S SUPERIOR) CN(2)     TD     G(2)

| | | |
|---|---|---|
| MD | MODEL CODE | XXXX |
| | MODEL NAME | AA-123 |
| NMa | OPERATOR NAME | AAA |
| NMb | OWNER NAME | BBB |
| DTa | DETECTED DATE AND TIME | 2014/08/01 12:35:40 |
| DTb | TRANSMITTED DATE AND TIME | 2014/08/01 12:35:45 |
| LD | POSITION INFORMATION LATITUDE | N043426133 |
| | LONGITUDE | E141568373 |
| | LOCATION | ..., Z TOWN, Y CITY, X PREFECTURE |
| AD | TROUBLE CONTENT | ABNORMALITY OF MOVEMENT RANGE EXCEEDING MOVEMENT LIMITATION RANGE |
| FD | ESTIMATED CAUSE | AUTO THEFT MIGHT HAVE OCCURRED |
| ED | SERIOUSNESS | A |
| AC | ACCESS INFORMATION | HTTP://ABC/DEF/002/20140801/12:35:50 |
| | INSTRUCTION INFORMATION | CALL OPERATOR AND OWNER — AS |
| MM | TROUBLESHOOTING MANUAL RELATED INFORMATION | CHECK WHETHER AGRICULTURAL MACHINE IS NOT STOLEN |

FIG.12E (SERVICE PERSON'S SUPERIOR) CN(4)     TD     G(4)

| | | |
|---|---|---|
| MD | MODEL CODE | XXXX |
| | MODEL NAME | AA-123 |
| NMa | OPERATOR NAME | AAA |
| NMb | OWNER NAME | BBB |
| DTa | DETECTED DATE AND TIME | 2014/08/01 12:35:40 |
| DTb | TRANSMITTED DATE AND TIME | 2014/08/01 12:35:45 |
| LD | POSITION INFORMATION LATITUDE | N043426133 |
| | LONGITUDE | E141568373 |
| | LOCATION | ..., Z TOWN, Y CITY, X PREFECTURE |
| AD | TROUBLE CONTENT | ABNORMALITY OF MOVEMENT RANGE EXCEEDING MOVEMENT LIMITATION RANGE |
| FD | ESTIMATED CAUSE | AUTO THEFT MIGHT HAVE OCCURRED |
| ED | SERIOUSNESS | A |
| AC | ACCESS INFORMATION | HTTP://ABC/DEF/004/20140801/12:35:50 |
| | INSTRUCTION INFORMATION | CALL OPERATOR AND OWNER — AS |
| MM | TROUBLESHOOTING MANUAL RELATED INFORMATION | CHECK WHETHER AGRICULTURAL MACHINE IS NOT STOLEN |

FIG.17

|  | 134 | |
| --- | --- | --- |
| AC | DB3 | NMc |
| ACCESS INFORMATION | PERSON INFORMATION | |
| http://ABC/DEF/001/20140801_12:35:50 | ○△□ | |
| http://ABC/DEF/002/20140801_12:35:50 | ○△× | |
| http://ABC/DEF/003/20140801_12:35:50 | ○◆□ | |
| http://ABC/DEF/004/20140801_12:35:50 | ○◆◆ | |
| ⋮ | ⋮ | |

| MODEL INFORMATION || TROUBLE CONTENT IDENTIFICATION INFORMATION | TROUBLESHOOTING MANUAL RELATED INFORMATION |
| --- | --- | --- | --- |
| MODEL CODE | MODEL NAME | ERROR CODE | |
| XXXX | AA-123 | E01 | ADD COOLING WATER |
| YYYY | BB-456 | E02 | http://ABC/YYYY/E02 |
| ⋮ | ⋮ | ⋮ | ⋮ |

| MODEL INFORMATION | | SR | DTa | DTb | CD | DTc | DTd | TC |
|---|---|---|---|---|---|---|---|---|
| MODEL CODE | MODEL NAME | SERIAL NUMBER INFORMATION | DETECTED DATE AND TIME INFORMATION | TRANSMITTED DATE AND TIME INFORMATION | TROUBLE CONTENT IDENTIFICATION INFORMATION | TROUBLESHOOTING START DATE AND TIME INFORMATION | TROUBLESHOOTING COMPLETED DATE AND TIME INFORMATION | TROUBLESHOOTING CONTENT INFORMATION |
| | | | | | ERROR CODE | | | |
| XXXX | AA-123 | XX000099 | 2014/08/01 12:35:40 | 2014/08/01 12:35:45 | E01 | 2014/08/01 12:40:30 | 2014/08/01 13:40:10 | COOLING WATER HAS BEEN ADDED |
| .... | .... | .... | .... | .... | .... | .... | .... | .... |

| SD | DN | DB6 | EN |

| MACHINE IDENTIFICATION INFORMATION | OPERATOR CONTACT INFORMATION | OWNER CONTACT INFORMATION |
|---|---|---|
| TERMINAL PHONE NUMBER | | |
| 111-222-333 | XXX@123.com | XXX@456.com |
| ⋮ | ⋮ | ⋮ |

FIG.21

(OPERATOR) DN — TD — Ga

- MD → MODEL CODE     XXXX
-        MODEL NAME     AA-123
- NMa → OPERATOR NAME     AAA
- NMb → OWNER NAME     BBB
- DTa → DETECTED DATE AND TIME     2014/08/01 12:35:40
- DTb → TRANSMITTED DATE AND TIME     2014/08/01 12:35:45
- LD → POSITION INFORMATION LATITUDE     N043426133
-        LONGITUDE     E141568373
-        LOCATION     ···, Z TOWN, Y CITY, X PREFECTURE
- AD → TROUBLE CONTENT     ENGINE COOLING WATER TEMPERATURE RISING WARNING
- FD → ESTIMATED CAUSE     COOLING WATER MIGHT BE IN SHORTAGE
- ED → SERIOUSNESS     B
- RC → RECEPTION CHECK INFORMATION     [CHECK] — BT2

↑ TOUCH CHECK BUTTON

DIAGRAM ILLUSTRATING TROUBLESHOOTING SYSTEM

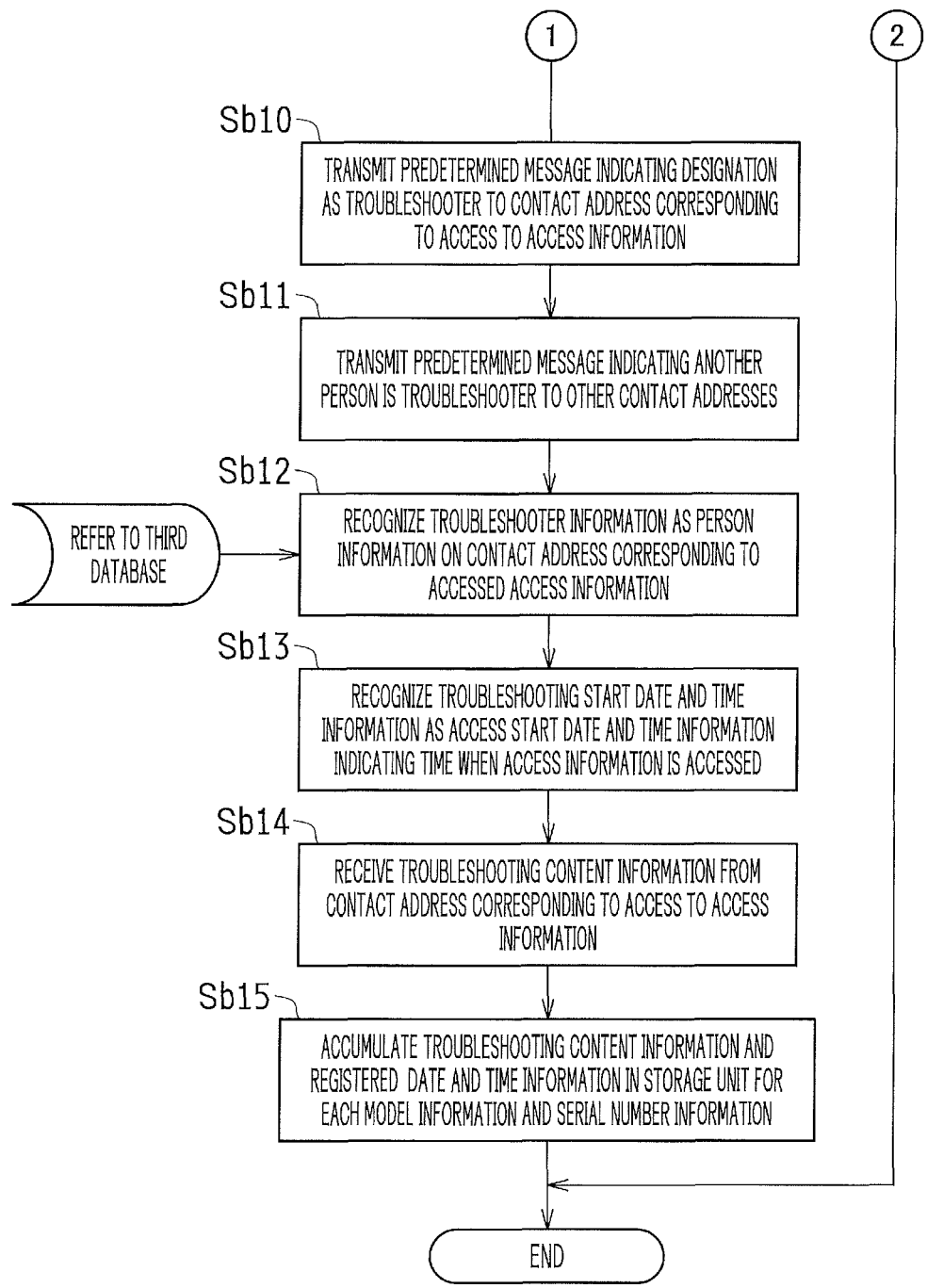

REMOTE SERVER

CROSS REFERENCE TO RELATED APPLICATIONS

This application is related to co-pending application: "REMOTE SERVER" filed in the names of Sosuke Murata, Akihiro Shinkuma and Minoru Koyama as a national phase entry of PCT/JP2015/074577, which is assigned to the assignee of the present application and is incorporated by reference herein.

TECHNICAL FIELD

The present invention relates to a remote server in a remote monitoring system for supporting troubleshooting when a trouble occurs in a work machine such as an agricultural machine.

BACKGROUND ART

For example, Patent Literature 1 discloses a system to support troubleshooting applied to failure, malfunctioning, or auto theft that has occurred in a work machine such as an agricultural machine. Specifically, Patent Literature 1 discloses a management device that provides information required for a service to a service person, based on a work report related to a moving body.

CITATION LIST

Patent Literature

PTL1: Japanese Patent No. 4349477

SUMMARY OF INVENTION

Technical Problem

However, a configuration of notifying an operator or the like of the moving body of information corresponding to seriousness (urgency) of the trouble is not disclosed in Patent Literature 1.

In view of the above, an object of the present invention is to provide a configuration capable of notifying an operator or the like of a moving body of information corresponding to seriousness of a trouble.

Solution to Problem

To achieve the object described above, the present invention provides a remote server that receives from a work machine, position information indicating a position of the work machine, trouble content identification information indicating a content of trouble in the work machine, and detected date and time information indicating date and time when the trouble has been detected and/or transmitted date and time information indicating date and time when information has been transmitted from the work machine, together with unique identification information of the work machine, in which based on the unique identification information, model information indicating a model of the work machine, operator name information indicating a name of an operator of the work machine and/or owner name information indicating a name of an owner of the work machine, and a plurality of pieces of contact information each indicating a corresponding one of a plurality of contact addresses of an entity in charge of maintenance for the work machine are identified, based on the trouble content identification information, trouble content information indicating the content of the trouble, estimated cause information indicating an estimated cause of the content of the trouble, and seriousness information indicating seriousness of the content of the trouble are identified, transmission information is simultaneously transmitted to the contact addresses indicated by the plurality of pieces of contact information identified, the transmission information including the model information, the operator name information and/or the owner name information, the detected date and time information and/or the transmitted date and time information, the position information, the trouble content information, the estimated cause information, and the seriousness information, and when the seriousness information has a highest rank, instruction information instructing a phone call to the operator and/or the owner is added to the transmission information to be transmitted to the contact addresses indicated by the plurality of pieces of contact information.

The term "trouble" in the present invention includes defects such as failure and malfunctioning and further includes an abnormality that might be indicative of auto theft. Here, the "abnormality that might be indicative of auto theft" has the highest rank of the seriousness information.

In an exemplary aspect of the present invention, based on the unique identification information, contact information on the operator and/or contact information on the owner may be identified, and when the seriousness rank is not the highest rank, reception check information may be added to the transmission information to be transmitted to a contact address indicated by the contact information on the operator and/or the contact information on the owner, the reception check information instructing reception check in the work machine.

Advantageous Effects of Invention

With the present invention, an operator or the like of a moving body can be notified of information corresponding to the seriousness of the trouble.

BRIEF DESCRIPTION OF DRAWINGS

FIG. 6 is a data structure diagram schematically illustrating event information received by the remote server from the remote monitoring terminal device.

FIG. 7 is a schematic diagram illustrating a data structure of an example of a first database in which machine identification information is stored while being associated with model information, operator name information, owner name information, and a plurality of pieces of contact information.

FIG. 8 is a schematic diagram illustrating a data structure of an example of a second database storing trouble content information, estimated cause information, and seriousness information for each piece of trouble content identification information.

FIG. 12B is a plan view illustrating an example of a display mode on a corresponding one of the display screens of the mobile terminal device displaying the transmission information representing the email transmitted from the remote server and received by the contact address of a corresponding one of the contact information, in a case where the seriousness information has the highest rank, illustrating a display screen at a contact address.

FIG. 12C is a plan view illustrating an example of a display mode on a corresponding one of the display screens of the mobile terminal device displaying the transmission information representing the email transmitted from the remote server and received by the contact address of a corresponding one of the contact information, in a case where the seriousness information has the highest rank, illustrating a display screen at another contact address.

FIG. 12D is a plan view illustrating an example of a display mode on a corresponding one of the display screens of the mobile terminal device displaying the transmission information representing the email transmitted from the remote server and received by the contact address of a corresponding one of the contact information, in a case where the seriousness information has the highest rank, illustrating a display screen at another contact address.

FIG. 12E is a plan view illustrating an example of a display mode on a corresponding one of the display screens of the mobile terminal device displaying the transmission information representing the email transmitted from the remote server and received by the contact address of a corresponding one of the contact information, in a case where the seriousness information has the highest rank, illustrating a display screen at another contact address.

FIG. 17 is a schematic diagram illustrating a data structure of an example of a third database storing person information for each access information.

FIG. 18 is a schematic diagram illustrating a data structure of an example of a fourth database storing troubleshooting manual related information for each combination between the model information and the trouble content identification information.

FIG. 19 is a schematic diagram illustrating a data structure of an example of a fifth database storing the detected date and time information, the transmitted date and time information, the trouble content identification information, the troubleshooting start date and time information, the troubleshooting completed date and time information, and the troubleshooting content information for each combination between the model information and serial number information.

FIG. 20 is a schematic diagram illustrating a data structure of an example of a sixth database storing operator contact information and owner contact information associated with the machine identification information.

FIG. 21 is a plan view illustrating an example of display modes on a display screen of a mobile terminal device displaying an email transmitted from the remote server to the contact address of the operator contact information.

FIG. 25 is a flowchart illustrating the second half of the example of the control operation in the troubleshooting system according to the present embodiment.

DESCRIPTION OF EMBODIMENTS

An embodiment of the present invention is described with reference to the attached drawings. In the embodiment, an agricultural machine such as a combine harvester, a tiller, or a rice-trans planter is described as an example of a work machine.

[Overall Configuration of Remote Monitoring System]

Figure 1:
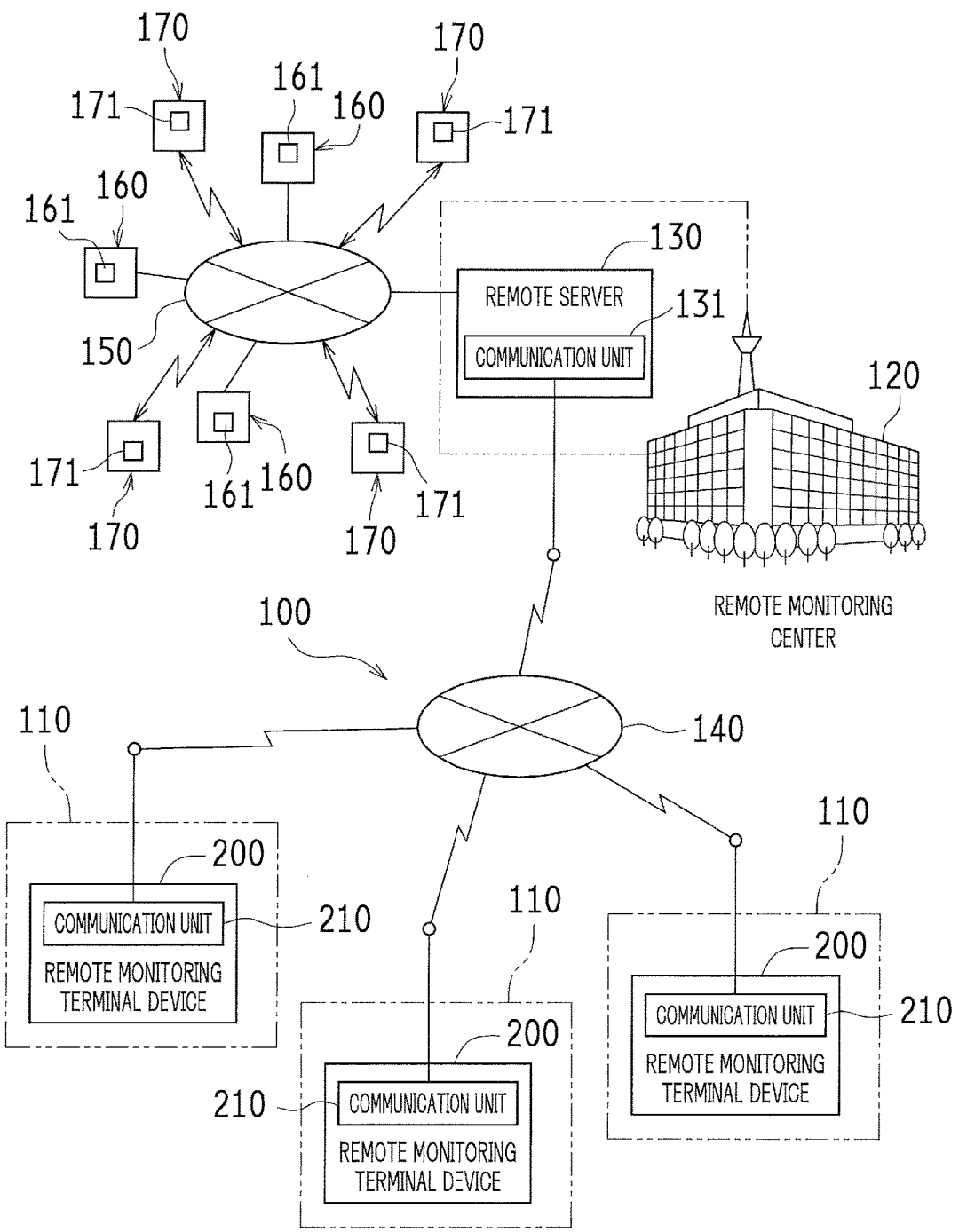
FIG. 1 is a schematic configuration diagram schematically illustrating an example of a communication configuration involving no access point in a remote monitoring system for remotely monitoring agricultural machines.
Figure 2:
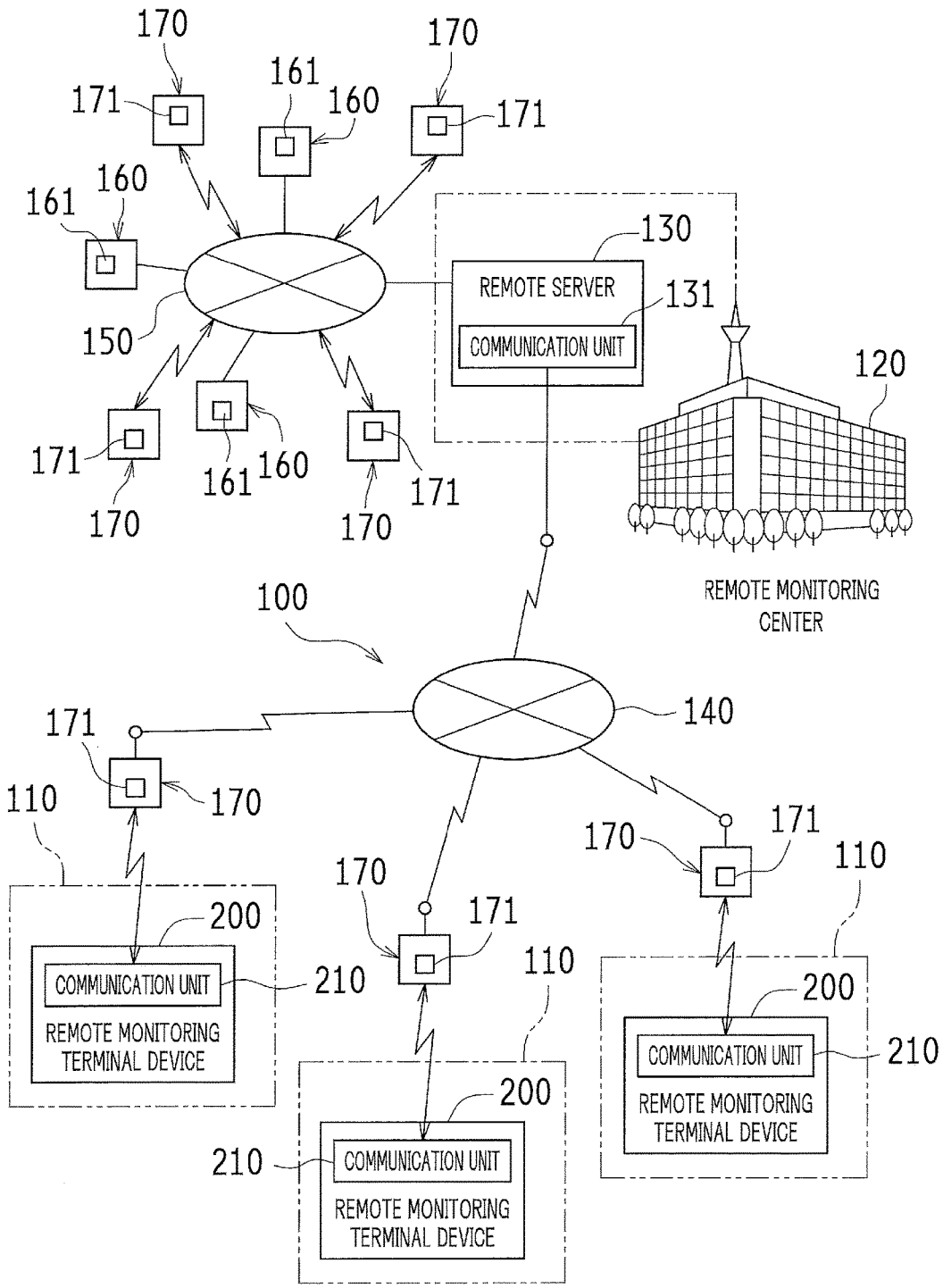
FIG. 2 is a schematic configuration diagram schematically illustrating an example of a communication configuration involving an access point in the remote monitoring system for remotely monitoring the agricultural machines.
Figure 3:
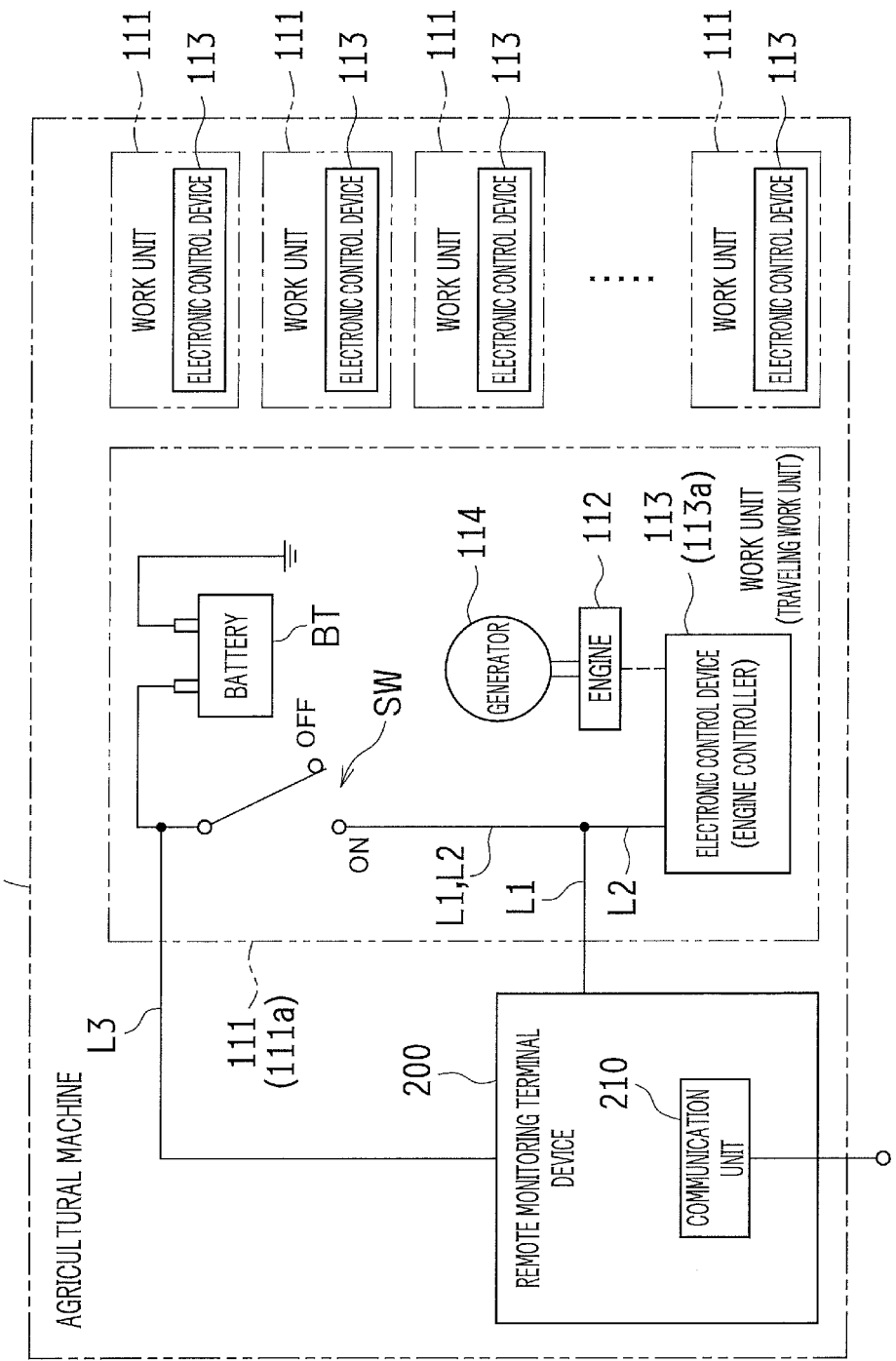
FIG. 3 is a block diagram illustrating a schematic configuration of each of the agricultural machines including a remote monitoring terminal device.
Figure 4:
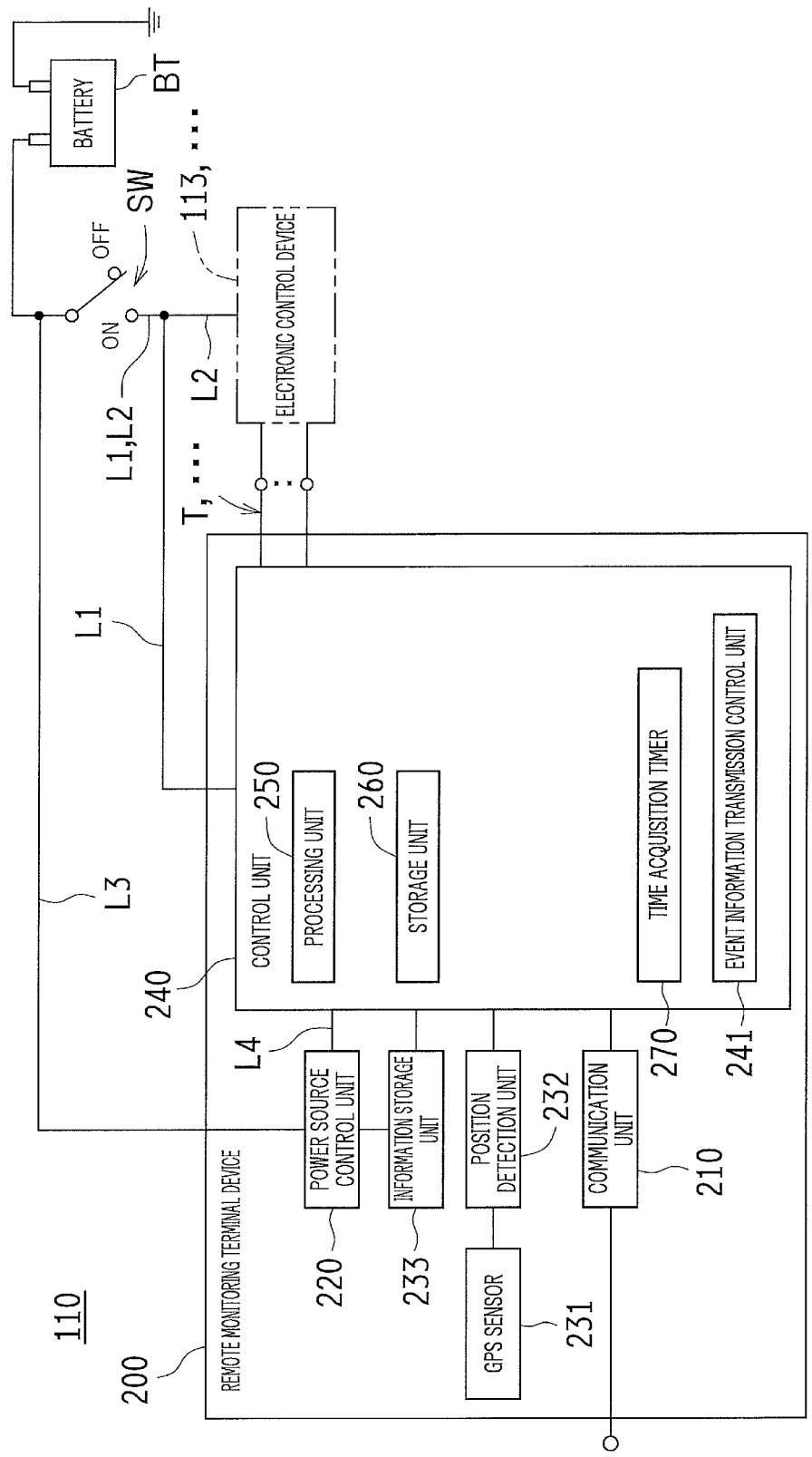
FIG. 4 is a block diagram illustrating a schematic configuration of the remote monitoring terminal device in the agricultural machine.

FIG. 1 is a schematic configuration diagram schematically illustrating an example of a communication configuration involving no access point in a remote monitoring system 100 for remotely monitoring agricultural machines 110, . . . . FIG. 2 is a schematic configuration diagram schematically illustrating an example of a communication configuration involving an access point in the remote monitoring system 100 for remotely monitoring the agricultural machines 110, . . . . FIG. 3 is a block diagram illustrating a schematic configuration of each of the agricultural machines 110, . . . including a remote monitoring terminal device 200. FIG. 4 is a block diagram illustrating a schematic configuration of the remote monitoring terminal device 200 in the agricultural machine 110.

As illustrated in FIGS. 1 and 2, the remote monitoring system 100 includes: one or a plurality of (plurality in this example) the agricultural machines (an example of work machines) 110, . . . ; the remote monitoring terminal device 200 provided in each of the agricultural machines 110, . . . ; and a remote server 130 connected to the remote monitoring terminal device 200 through a communication network 140.

The remote server 130 is provided in a remote monitoring center 120 at a location far away from the agricultural machines 110, . . . , and collects and accumulates predetermined operation information (operation data) that is data related to an operation state of the agricultural machine 110. The remote server 130 is connected to fixed terminal devices (more specifically, client computers) 160, . . . , such as a personal computer, and/or mobile terminal devices (more specifically, client computers) 170, . . . such as a mobile terminal device including a multi-function mobile phone (what is known as a smartphone) or a tablet, through a network 150 such as a local area network (LAN) or the Internet. The data accumulated is fetched by the fixed terminal devices 160, . . . and/or the mobile terminal devices 170, . . . to be usable by a user such as an owner, a dealer, and the like of the agricultural machine 110. The fixed terminal device 160 and the mobile terminal device 170 include: control units 161 and 171. The control units 161 and 171 display display information and various input screens, based on data transmitted from the remote server 130, and receive required information input by the user.

The remote monitoring terminal device 200 and the remote server 130 respectively include communication units 210 and 131 (more specifically, communication modules). The remote monitoring terminal device 200 and the remote server 130 are connected to each other through the communication network 140 with their communication units 210 and 131. Thus, information can be transmitted and received between the remote monitoring terminal device 200 and the remote server 130. With such a configuration, the remote server 130 enables the user in the remote monitoring center 120 to remotely monitor the agricultural machines 110, . . . .

The communication network 140 may be a wired communication network, a wireless communication network, and a combination of the wired communication network and the wireless communication network.

An example of a communication configuration in which the remote server 130 and the remote monitoring terminal device 200 communicate with each other includes a communication configuration involving no access point (see FIG. 1) and a communication configuration involving an access point (in this example, the mobile terminal device 170) (see FIG. 2).

A typical example of the communication network 140, in the communication configuration involving no access point illustrated FIG. 1, includes a public line network that is provided by a telecommunications carrier for communications between terminal devices such as a fixed phone and a mobile phone.

A typical example of the communication network 140, in the communication configuration involving an access point (in this example, the mobile terminal device 170) illustrated in FIG. 2, includes the Internet via a public line network. In this configuration, the communication unit 210 in the remote monitoring terminal device 200 can communicate with the mobile terminal device 170, which can access the Internet via the access point, through short-range wireless communications such as a wireless LAN conforming to the IEEE802.11 standard a typical example of which includes the Wi-Fi (registered trademark) standard (communications using what is known as a tethering function of the mobile terminal device 170).

As illustrated in FIG. 3, the agricultural machines 110, . . . each include one or a plurality of (plurality in this example) work units 111, . . . and the remote monitoring terminal device 200. The work units 111, . . . in an example where the agricultural machine is a combine harvester may include a traveling work unit, a reaping work unit, a threshing work unit, and the like.

The work units 111, . . . each includes a corresponding one of electronic control devices (more specifically, controllers) 113, . . . . The electronic control devices 113, . . . each issue an instruction to various actuators (not illustrated) so that control is performed for achieving an appropriate driving state of each of the work units 111, . . . . The electronic control devices 113, . . . transmit and receive data to and from each other based on a controller area network (CAN) standard.

More specifically, the electronic control devices 113, . . . each operate to control the driving state of a corresponding one of the work units 111, . . . based on detected value information (signal) detected by various sensors and ON/OFF information on various switches in the corresponding one of the work units 111, . . . . The electronic control devices 113, . . . each determine whether a trouble (more specifically, defect, abnormality, or the like) such as failure, malfunctioning, or auto theft of the agricultural machine 110 has occurred, as appropriate. When the trouble occurs, the electronic control devices 113, . . . generate information (for example, an error code) corresponding to the trouble.

A work unit (traveling work unit 111a), which is one of the work units 111, . . . that operates an engine 112, includes: the engine 112; the electronic control device 113 (engine controller 113a) that controls the entire engine by monitoring a rotation speed and a load condition of the engine 112, and instructing optimum injection pressure and injection timing to a fuel system; a generator 114; and a starting switch SW, and is provided with a battery BT. The electronic control device 113 (engine controller 113a) performs operation control for the work unit 111 (traveling work unit 111a), as well as driving start/stop operation, and driving state control by driving the engine 112.

While the engine 112 is operating, the battery BT in the work unit 111 (traveling work unit 111a) is charged as appropriate by power supplied from the generator 114.

The starting switch SW of the work unit 111 (traveling work unit 111a) is a selector switch for selectively switching between a power ON state and a power OFF state. In the power ON state, the battery BT supplies power to a control unit 240 (see FIG. 4) of the remote monitoring terminal device 200 and the electronic control device 113 (engine controller 113a). In the power OFF state, the power supply from the battery BT to the control unit 240 of the remote monitoring terminal device 200 and the electronic control device 113 (engine controller 113a) is cut off.

More specifically, the battery BT is connected to both a power source connection line L1 and a power source connection line L2 through the starting switch SW. The power source connection line L1 is connected to the control unit 240 of the remote monitoring terminal device 200. The power source connection line L2 is connected to the electronic control device 113 (engine controller 113a).

In this example, the starting switch SW serves as what is known as a key switch and has an "ON" terminal as a connection terminal for the power source connection lines L1 and L2 and an "OFF" terminal as a terminal in a state where the starting switch SW is in an OFF state.

Regardless of whether the starting switch SW is in an ON state or the OFF state, the battery BT is connected to a power source control unit 220 (see FIG. 4) of the remote monitoring terminal device 200 through a power source connection line L3.

[Remote Monitoring Terminal Device]

As illustrated in FIG. 4, the remote monitoring terminal device 200 includes: the communication unit 210; the control unit 240 that transmits and receives data through communications, performs various types of input/output control, and controls calculation processing; the power source control unit 220 that supplies power to the control unit 240; and a plurality of connection terminals T, . . . to which operation information on an operation state of the agricultural machine 110 is input.

(Communication Unit)

The communication unit 210 can communicate with the communication unit 131 of the remote server 130 in the remote monitoring center 120 (see FIGS. 1 and 2) under a common communication protocol. The data transmitted and received through communications is converted by the communication unit 210 to be suitable for the communication protocol. The communication unit 210 transmits operation information on the agricultural machine 110 and the like, acquired by the control unit 240, to the remote server 130.

(Power Source Control Unit)

The power source control unit 220 is connected to the battery BT regardless of whether the starting switch SW is in the OFF state or the ON state. More specifically, the power source control unit 220 has an input side power source line (not illustrated) connected to the battery BT through the power source connection line L3. Thus, the battery BT constantly supplies power to the power source control unit 220.

The control unit 240 has a power source line (not illustrated) connected to an output side power source line (not illustrated) of the power source control unit 220 through a power source connection line L4.

(Connection Terminal)

Connection terminals T, . . . each has an input terminal for binary information (more specifically, a binary signal) such as error state information (more specifically, information which is 0 or 1 indicating whether an error has occurred), numerical value data, an error code, total information such as total time measured by a time meter (hour meter), and the like.

(Position Detection Unit)

In the present embodiment, the remote monitoring terminal device 200 performs the measurement by using the Global Navigation Satellite System (GNSS). In this example, the remote monitoring terminal device 200 further includes: a GPS sensor (an example of a position sensor) 231 that receives electric waves from a Global Positioning System (GPS) satellite; a position detection unit 232 that detects the position information and the like on the agricultural machine 110 based on the electric waves received by the GPS sensor 231; and an information storage unit 233 that temporarily stores various types of data including the position information detected by the position detection unit 232.

The GPS sensor 231 receives electric waves (information including the world standard time) from the GPS satellite. Here, the world standard time is Universal Time Coordinated (UTC).

The position detection unit 232 can detect information on a current location of the agricultural machine 110, as well as speed information on the agricultural machine 110 and azimuth information on the agricultural machine 110. Thus, the position information includes information on the latitude, the longitude, the speed, and the azimuth of the agricultural machine 110.

More specifically, the position detection unit 232, the GPS sensor 231, and the GPS satellite form a GPS satellite system (positioning system).

The information storage unit 233 includes a nonvolatile memory such as a flash memory. The information storage unit 233 is connected to the power source control unit 220 and is constantly supplied with power from the battery BT.

(Control Unit)

The control unit 240 includes: a processing unit 250 including a microcomputer such as a central processing unit (CPU); a storage unit 260 including a nonvolatile memory, such as a read only memory (ROM), and a volatile memory such as a random access memory (RAM); and a time acquisition timer 270 having a clock function for obtaining date and time information on the remote monitoring terminal device 200.

The control unit 240 performs operation control on various components, with the processing unit 250 loading a control program, stored in the ROM of the storage unit 260 in advance, onto the RAM of the storage unit 260 and executing the control program.

The control unit 240 further includes an event information transmission control unit 241. When a predetermined event including a predetermined trouble of the agricultural machine 110, such as failure, malfunctioning, or auto theft, occurs, the event information transmission control unit 241 transmits event information including trouble content identification information indicating the content of the trouble of the agricultural machine 110.

When a predetermined event including a predetermined trouble occurs, the event information transmission control unit 241 transmits to the remote server 130, event information including trouble content identification information, together with identification information unique to the agricultural machine 110 (hereinafter, referred to as machine identification information SD). The machine identification information SD may be a terminal phone number of the remote monitoring terminal device 200, or may be an identification number (which may be numbers only, codes only, or a combination of numbers and codes) that is set in advance and is unique to the agricultural machine 110. In the communication configuration illustrated in FIG. 1, the terminal phone number of the remote monitoring terminal device 200 is employed. In the communication configuration illustrated in FIG. 2, an identification number unique to the agricultural machine 110 registered in advance in the remote monitoring terminal device 200 is employed.

For example, "the predetermined event occurs" when information indicating an abnormality that might be indicative of auto theft has been detected. For example, "information indicating an abnormality that might be indicative of auto theft is detected" when the following information is detected: information indicating an abnormality due to the movement range of the agricultural machine 110 detected by the GPS sensor 231 exceeding a movement limitation range set in advance and/or information indicating an abnormality due to an operation period or an operation time point of the agricultural machine 110 exceeding an operation limitation period or operation time point range set in advance.

The above described "event information" includes: position information (more specifically, latitude and longitude) indicating the position of the agricultural machine 110 detected once in every predetermined period; date and time information indicating date and time at which data is acquired (more specifically, the world standard time including year, month, date, hour, minute, and second); and trouble content identification information detected once in every predetermined period. The trouble content identification information includes: binary information (more specifically, contact point information and error determination information) detected once in every predetermined period; detected value information (more specifically, the rotation speed of the engine 112, engine load factor, vehicle speed, error code, substrate temperature, battery voltage, and the like per unit time) detected once in every predetermined period; total information detected once in every predetermined period; and error information detected once in every predetermined period. The position information may include speed and azimuth of the agricultural machine 110.

Thus, the storage unit 260 stores instantaneous data detected once in every predetermined period as the event information including position information on the agricultural machine 110, date and time information, and trouble content identification information.

[Remote Server]

Figure 5:
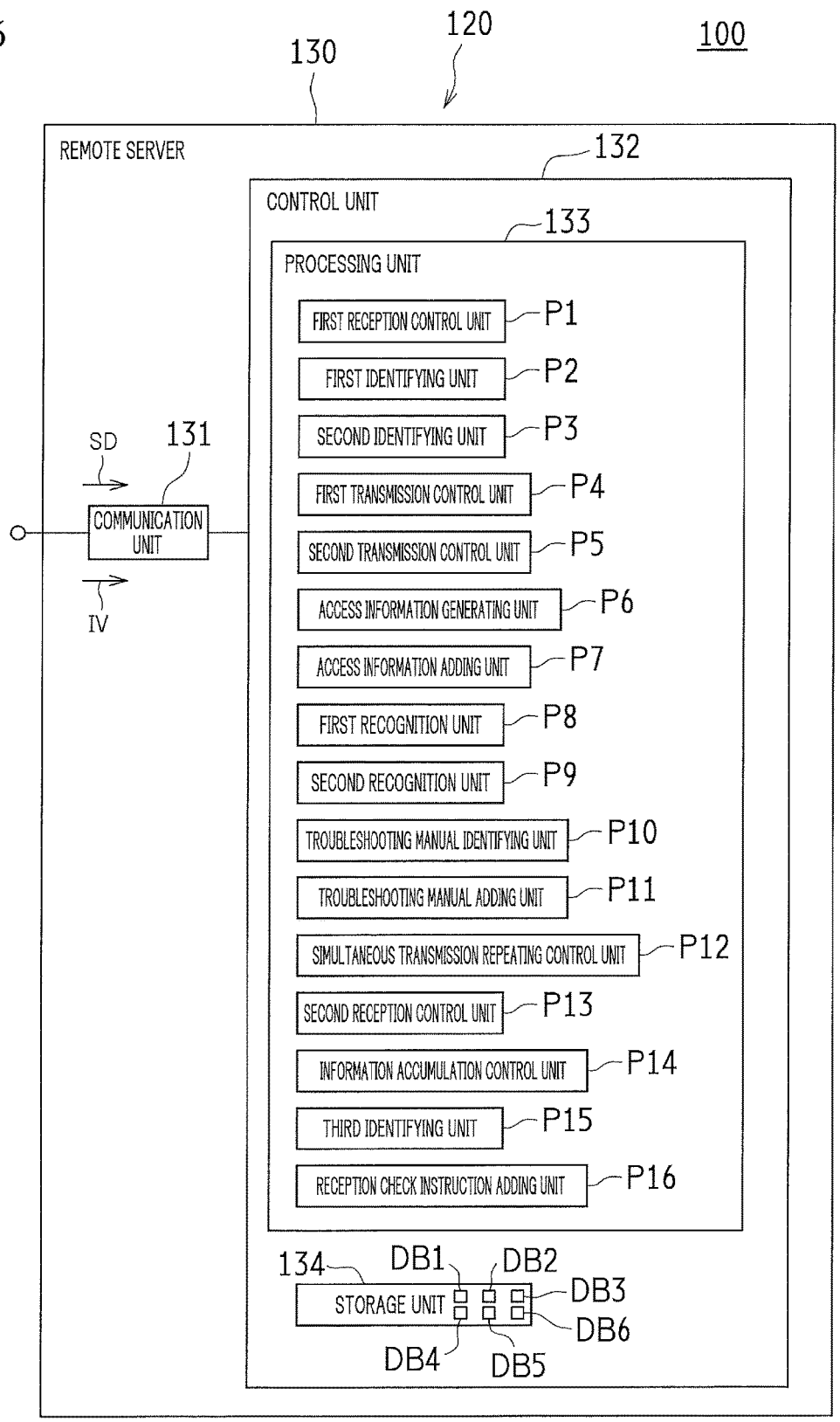
FIG. 5 is a block diagram illustrating a schematic configuration of a control unit in a remote server provided in a remote monitoring center.

FIG. 5 is a block diagram illustrating a schematic configuration of a control unit 132 in the remote server 130 provided in the remote monitoring center 120.

As illustrated in FIG. 5, the remote server 130 provided in the remote monitoring center 120 includes: the communication unit 131; and the control unit 132 that transmits and receives data through communications, performs various types of input/output control, and controls calculation processing.

(Communication Unit)

The communication unit 131 can communicate with the communication unit 210 of the remote monitoring terminal device 200 (see FIGS. 1 to 4) under the common communication protocol. The data transmitted and received through communications is converted by the communication unit 131 to be suitable for the communication protocol. The communication unit 131 receives various types of data such as event information IV described above.

(Control Unit)

The control unit 132 includes: a processing unit 133 including a microcomputer such as a CPU; and a storage unit 134 including a ROM and a volatile memory such as a RAM.

The control unit 132 performs operation control on various components, with the processing unit 133 loading a control program, stored in the ROM of the storage unit 134 in advance, onto the RAM of the storage unit 134 and executing the control program.

In the present embodiment, the control unit 132 in the remote server 130 includes a control configuration forming a system (hereinafter, referred to as troubleshooting system) for supporting troubleshooting when a trouble occurs in the agricultural machine 110.

More specifically, the control unit 132 includes a first reception control unit P1, a first identifying unit P2, a second identifying unit P3, and a first transmission control unit P4.

Components with reference numerals in FIG. 5 that are not described above will be described below.

—First Reception Control Unit—

FIG. 6 is a data structure diagram schematically illustrating the event information IV received by the remote server 130 from the remote monitoring terminal device 200. In an example illustrated in FIG. 6, position information LD includes data indicating the location (address) identified by the remote server 130 or the remote monitoring terminal device 200 based on the longitude and the latitude by using a separately provided map database stored in advance or on the Internet.

When the event including a trouble such as failure, malfunctioning, or auto theft of the agricultural machine 110 occurs, the first reception control unit P1 receives information as illustrated in FIG. 6 together with the machine identification information SD from the remote monitoring terminal device 200 in the agricultural machine 110. The information includes the event information IV on the occurred event including the position information LD, trouble content identification information CD (trouble content identification information, such as binary information, detected value information, total information, and error code, which is the error code in the example illustrated in FIG. 6), detected date and time information DTa indicating the date and time when the trouble is detected, and/or transmitted date and time information DTb indicating the date and time when the information is transmitted (in this example, the detected date and time information DTa and the transmitted date and time information DTb are both included).

Components with reference numerals in FIG. 6 that are not described above will be described below.

—First Identifying Unit—

FIG. 7 is a schematic diagram illustrating a data structure of an example of a first database DB1 in which the machine identification information SD is stored while being associated with model information MD, operator name information NMa, owner name information NMb, and a plurality of pieces of contact information CN(1) to CN(n). In the figure, n is an integer equal to or larger than 2. In this example, n is 4. The contact information CN(1) is contact information on a sales person (more specifically, the name and the email address of the sales person). The contact information CN(2) is contact information on a sales person's superior (more specifically, the name and the email address of the sales person's superior). The contact information CN(3) is contact information on a service person (more specifically, the name and the email address of the service person). The contact information CN(4) is contact information on a service person's superior (more specifically, the name and the email address of the service person's superior). In the description below, n is 4. However, this should not be construed in a limiting sense, and n may be 2, 3, or 5 or more.

The first identifying unit P2 identifies the model information MD indicating the model of the agricultural machine 110, the operator name information NMa indicating the name of the operator (user) of the agricultural machine 110 and/or the owner name information NMb indicating the name of the owner of the agricultural machine 110 (in this example, both of the operator name information NMa and the owner name information NMb are identified), and the plurality of pieces of contact information CN(1) to CN(4) each indicating a corresponding one of the contact addresses of an entity in charge of the maintenance for the agricultural machine 110, based on the machine identification information SD as illustrated in FIG. 7.

The model information MD, the operator name information NMa, the owner name information NMb, and the plurality of pieces of contact information CN(1) to CN(4) can be identified by using the machine identification information SD. For example, the model information MD, the operator name information NMa, the owner name information NMb, and the plurality of pieces of contact information CN(1) to CN(4) can be identified based on a terminal phone number and an identification number set in the remote monitoring terminal device 200 in the agricultural machine 110.

The first database DB1 is stored in the storage unit 134 (see FIG. 5). In the first database DB1 in the storage unit 134, the model information MD (the model code and the model name of the agricultural machine 110 in the example illustrated in FIG. 7), the operator name information NMa, the owner name information NMb, and the plurality of pieces of contact information CN(1) to CN(4) are stored while being associated with the machine identification information SD (the terminal phone number in the example illustrated in FIG. 7). The control unit 132 can recognize the model information MD, the operator name information NMa, the owner name information NMb, and the plurality of pieces of contact information CN(1) to CN(4) by referring to the first database DB1 in the storage unit 134 based on the machine identification information SD.

As described above, the model name, the operator name, the owner name, and the plurality of contact addresses can be identified by using the model information MD, the operator name information NMa, the owner name information NMb, and the plurality of pieces of contact information CN(1) to CN(4) set (stored) while being associated with the machine identification information SD. More specifically, the first identifying unit P2 can obtain the model name of the agricultural machine 110, the name of the operator of the agricultural machine 110, the name of the owner of the agricultural machine 110, and a plurality of contact addresses of the entity in charge of the maintenance, from the model information MD, the operator name information NMa, the owner name information NMb, and the plurality of pieces of contact information CN(1) to CN(4) acquired from the first database DB1, based on the terminal phone number and the identification number set in the remote monitoring terminal device 200 in the agricultural machine 110.

In the present embodiment, the first identifying unit P2 identifies the model information MD, the operator name information NMa, the owner name information NMb, and the plurality of pieces of contact information CN(1) to CN(4) that match the machine identification information SD received by the first reception control unit P1, in the first database DB1 (see FIG. 7) in the storage unit 134.

—Second Identifying Unit—

FIG. 8 is a schematic diagram illustrating a data structure of an example of a second database DB2 storing trouble content information AD, estimated cause information FD, and seriousness information ED for each piece of trouble content identification information CD. In this example, the seriousness information ED is classified into three levels A to C, with A indicating the highest rank of the seriousness information ED, B indicating a middle rank of the seriousness information ED, and C indicating the lowest rank of the seriousness information ED. For example, the seriousness information ED is determined in advance from the trouble content identification information CD, based on a predetermined determination standard.

As illustrated in FIG. 8, the second identifying unit P3 identifies the trouble content information AD indicating the content of the trouble, the estimated cause information FD indicating the estimated cause of the content of the trouble, and the seriousness information ED indicating the seriousness (urgency) of the content of the trouble, based on the trouble content identification information CD.

The trouble content information AD, the estimated cause information FD, and the seriousness information ED can be identified by using the trouble content identification information CD.

The second database DB2 is stored in the storage unit 134 (see FIG. 5). In the second database DB2 stored in the storage unit 134, the trouble content information AD, the estimated cause information FD, and the seriousness information ED are stored in advance while being associated with the trouble content identification information CD (the error code in the example illustrated in FIG. 8). The control unit 132 can recognize the trouble content information AD, the estimated cause information FD, and the seriousness information ED by referring to the second database DB2 in the storage unit 134 based on the trouble content identification information CD.

As described above, the content of the trouble, the estimated cause of the content of the trouble, and the seriousness of the content of the trouble can be identified by using the trouble content information AD, the estimated cause information FD, and the seriousness information ED set (stored) while being associated with the trouble content identification information CD. More specifically, the second identifying unit P3 can obtain the content of the trouble, the estimated cause, and the seriousness from the trouble content information AD, the estimated cause information FD, and the seriousness information ED acquired from the second database DB2 based on the trouble content identification information CD.

In the present embodiment, the second identifying unit P3 identifies the trouble content information AD, the estimated cause information FD, and the seriousness information ED matching the trouble content identification information CD received by the first reception control unit P1, in the second database DB2 (see FIG. 8) in the storage unit 134.

—First Transmission Control Unit—

FIG. 9 to FIG. 12 are plan views illustrating an example of display modes of display screens G(1) to G(4) in the mobile terminal device 170 displaying transmission information TD in an email transmitted from the remote server 130 to the contact addresses indicated by the pieces of contact information CN(1) to CN(4).

Figure 9:
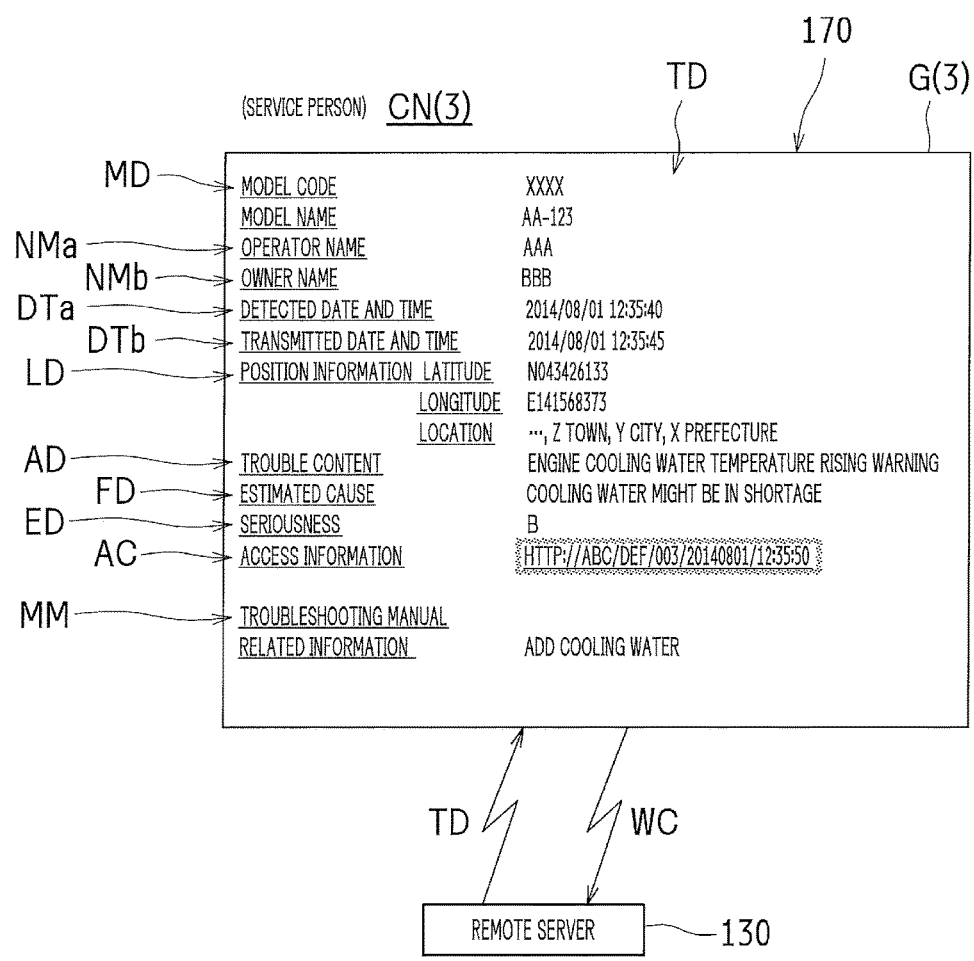
FIG. 9 is a plan view illustrating an example of display modes of display screens in a mobile terminal device displaying transmission information in an email transmitted from the remote server to one contact address indicated by a piece of contact information.
Figure 10:
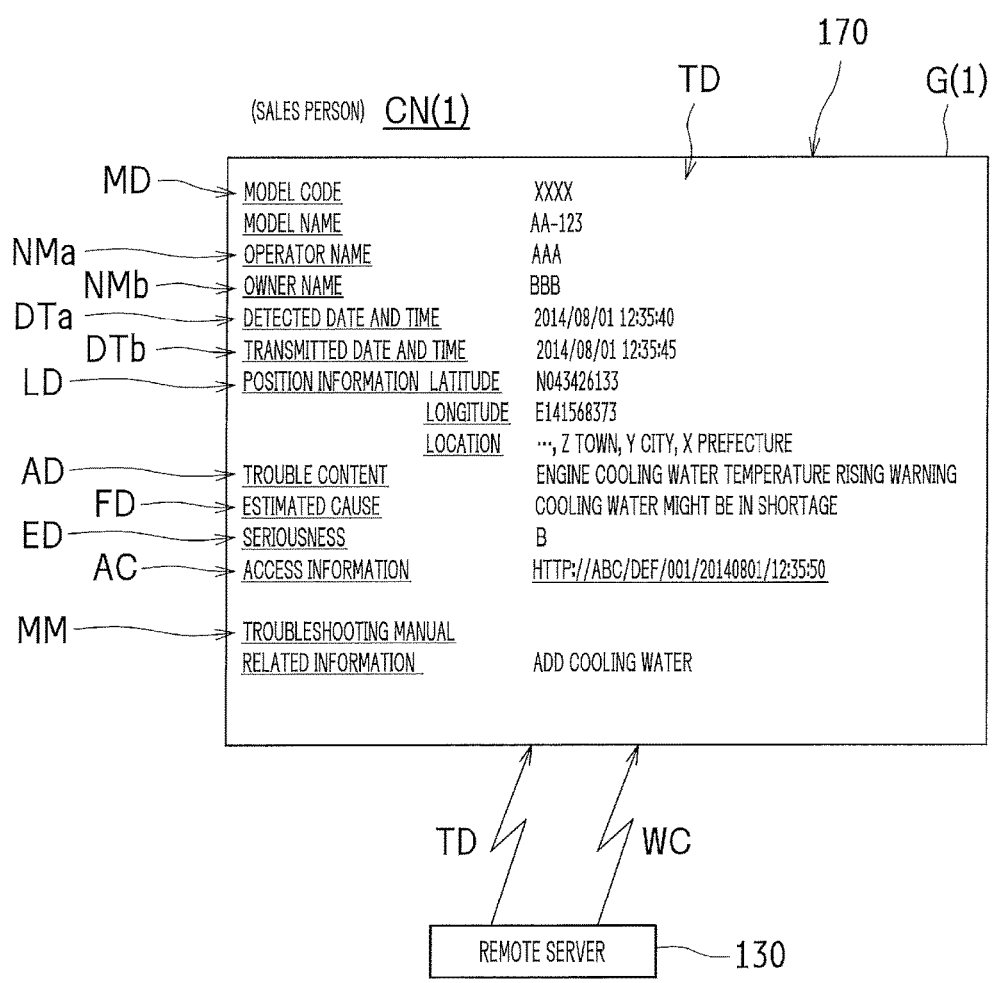
FIG. 10 is a plan view illustrating an example of display modes of display screens in a mobile terminal device displaying transmission information in an email transmitted from the remote server to another contact address indicated by a piece of contact information.
Figure 11:
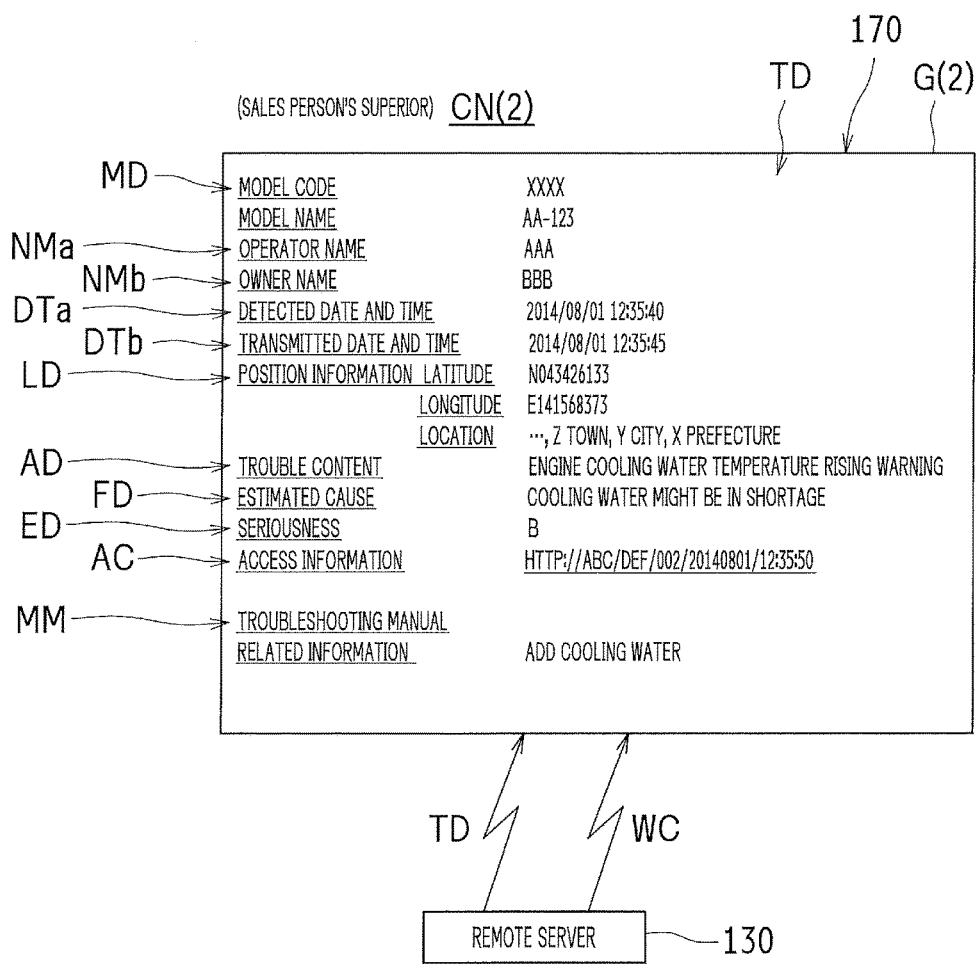
FIG. 11 is a plan view illustrating an example of display modes of display screens in a mobile terminal device displaying transmission information in an email transmitted from the remote server to another contact address indicated by a piece of contact information.
Figure 12:
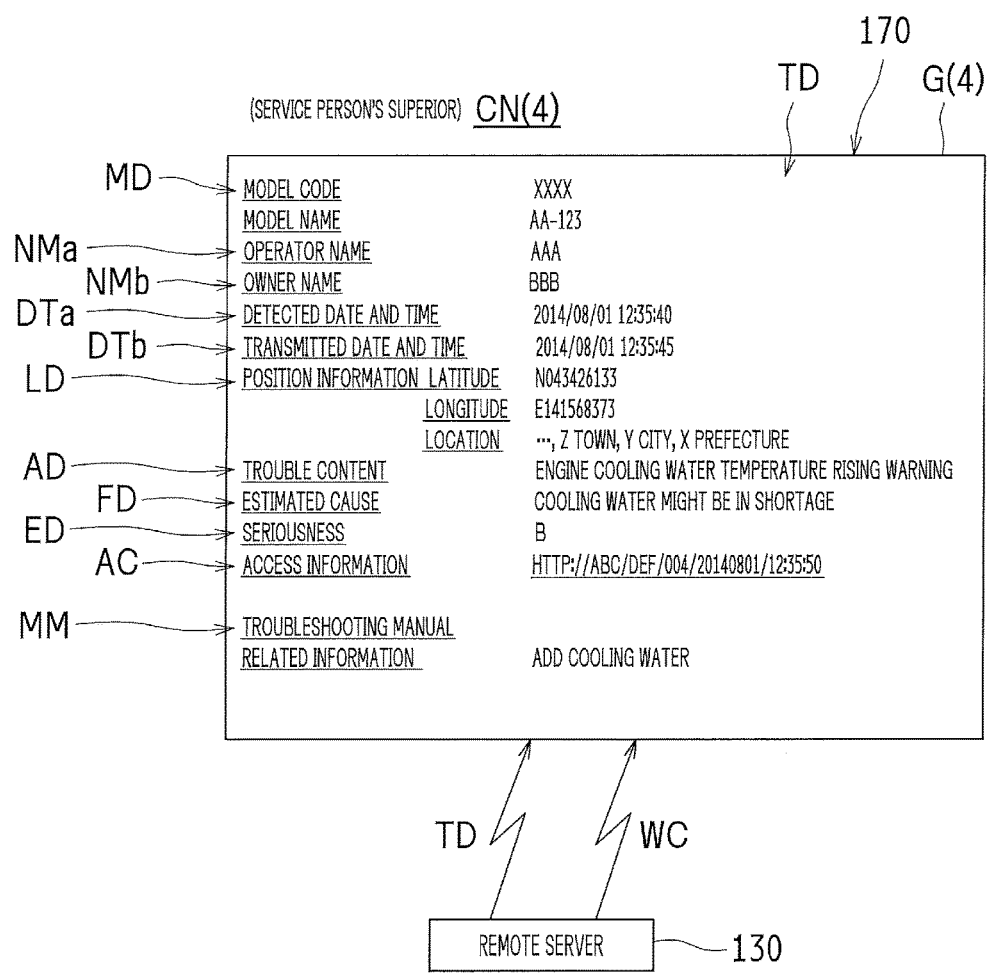
FIG. 12 is a plan view illustrating an example of display modes of display screens in a mobile terminal device displaying transmission information in an email transmitted from the remote server to a contact address of another person indicated by a piece of contact information.

FIG. 9 illustrates the display screen G(3) corresponding to any one of the contact addresses (the contact address of the service person indicated by the contact information CN(3) in this example). FIG. 10 illustrates the display screen G(1) corresponding to another one of the contact addresses (the contact address of the sales person indicated by the contact information CN(1) in this example). FIG. 11 illustrates the display screen G(2) corresponding to another one of the contact addresses (the contact address of the sales person's superior indicated by the contact information CN(2) in this example). FIG. 12 illustrates the display screen G(4) corresponding to another one of the contact addresses (the contact address of the service person's superior indicated by the contact information CN(4) in this example). These similarly apply to FIG. 12B to FIG. 12E described later.

As illustrated in FIG. 9 to FIG. 12, the first transmission control unit P4 simultaneously transmits (an email in this example) to the contact addresses indicated by the plurality of pieces of contact information CN(1) to CN(4) identified by the first identifying unit P2, the transmission information TD including: the model information MD identified by the first identifying unit P2; the operator name information NMa and the owner name information NMb identified by the first identifying unit P2; the detected date and time information DTa and the transmitted date and time information DTb received by the first reception control unit P1; the position information LD received by the first reception control unit P1; the trouble content information AD identified by the second identifying unit P3; the estimated cause information FD identified by the second identifying unit P3; and the seriousness information ED identified by the second identifying unit P3.

Each of the display screens G(1) to G(4) of the mobile terminal device 170, respectively corresponding to the contact addresses indicated by the pieces of contact information CN(1) to CN(4), displays the transmission information TD as an email including a text including: the model information MD (the model code and the model name); the operator name information NMa (operator name); the owner name information NMb (owner name); the detected date and time information DTa (detected date and time); the transmitted date and time information DTb (transmitted date and time); the position information LD (latitude, longitude, and location); the trouble content information AD (content of the trouble); the estimated cause information FD (estimated cause); and the seriousness information ED (seriousness).

The first transmission control unit P4 is configured to transmit the information corresponding to the seriousness of the trouble to the contact addresses indicated by the plurality of pieces of contact information CN(1) to CN(4).

Figure 12A:
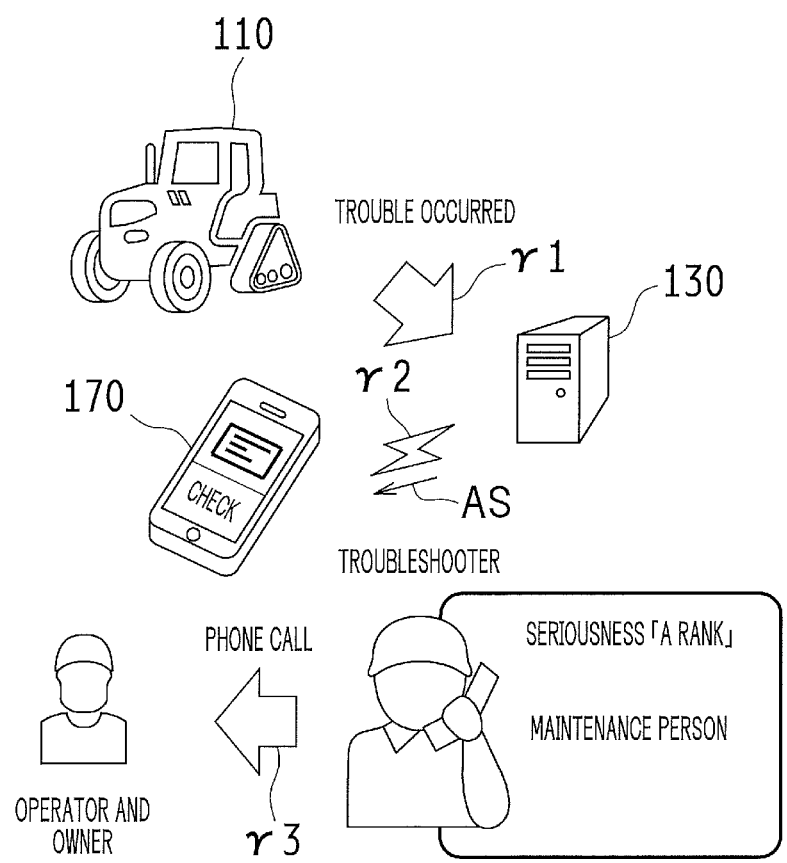
FIG. 12A is a schematic diagram illustrating a state in which the information corresponding to the seriousness of the trouble is transmitted to the contact addresses indicated by the plurality of pieces of contact information.

FIG. 12A is a schematic diagram illustrating a state in which the information corresponding to the seriousness of the trouble is transmitted to the contact addresses indicated by the plurality of pieces of contact information CN(1) to CN(4). FIG. 12B to FIG. 12E are each a plan view illustrating an example of a display mode on a corresponding one of the display screens G(1) to G(4) of the mobile terminal device 170 displaying the transmission information TD representing the email transmitted from the remote server 130 and received by the contact address of a corresponding one of the contact information CN(1) to CN(4), in a case where the seriousness information ED has the highest rank.

As illustrated in FIG. 12A and FIG. 12B to FIG. 12E, when a trouble occurs in the agricultural machine 110 (see γ1 in FIG. 12A) and the remote server 130 simultaneously transmits the transmission information TD to the contact addresses indicated by the plurality of pieces of contact information CN(1) to CN(4) (see γ2 in FIG. 12A), the first transmission control unit P4 adds instruction information AS, instructing a phone call to the operator and the owner, to the transmission information TD transmitted to the contact addresses indicated by the plurality of pieces of contact information CN(1) to CN(4), in a case where the seriousness information ED has the highest rank (the A rank such as auto theft in this example). The instruction information AS is a message "CALL OPERATOR AND OWNER" in the example illustrated in FIG. 12B to FIG. 12E.

—Second Transmission Control Unit—

In the present embodiment, the control unit 132 in the remote server 130 (see FIG. 5) further includes a second transmission control unit P5.

Upon receiving troubleshooting intention information WC (see FIG. 9 and FIG. 12B) for showing the intention to perform troubleshooting from any one of the contact addresses (in this example, the contact address indicated by the contact information CN(3)) indicated by the plurality of pieces of contact information CN(1) to CN(4), the second transmission control unit P5 transmits the troubleshooting intention information WC (see FIG. 10 to FIG. 12 and FIG. 12C to FIG. 12E) to the other one of the contact addresses (in this example, the contact addresses indicated by the pieces of contact information CN(1), CN(2), and CN(4)).

In the present embodiment, the reception of the troubleshooting intention information WC corresponds to access via individual access information AC (more specifically, Uniform Resource Locator (URL)) for accessing the remote server 130.

The URL used herein is an array of codes in a format for identifying a resource (information resource) of the remote server 130 connected to the Internet. When the individual access information AC is accessed, the remote server 130 can recognize contact information CN(i) (i is an integer between 1 and n, in this example, and n=4 and i=3) as one of the plurality of pieces of contact information CN(1) to CN(4) that corresponds to the accessed access information AC. In other words, when the remote server 130 is accessed with an operation using the access information AC (more specifically, URL), the troubleshooting intention information WC is transmitted to the remote server 130 from the contact address indicated by the contact information CN(i) (in this example, CN(3)) corresponding to the accessed access information AC. The remote server 130 can recognize the transmission of the troubleshooting intention information WC from the contact address indicated by the contact information CN(i) (in this example, CN(3)) corresponding to the accessed access information AC.

The control unit 132 in the remote server 130 (see FIG. 5) further includes an access information generating unit P6 and an access information adding unit P7.

—Access Information Generating Unit—

The access information generating unit P6 generates the individual access information AC (more specifically, URL) for each of the plurality of pieces of contact information CN(1) to CN(4) and each date and time information. In this example, the access information generating unit P6 adds the date and time information to the end of the individual access information AC (more specifically, URL). This date and time information is the date and time information indicating the time when the access information AC is generated. Alternatively, the date and time information may be the detected date and time information DTa or the transmitted date and time information DTb.

—Access Information Adding Unit—

The access information adding unit P7 adds the individual access information AC (more specifically, URL) generated by the access information generating unit P6 to the transmission information TD.

In the example illustrated in FIG. 9 and FIG. 12B, the access information adding unit P7 writes "http://ABC/DEF/003/20140801#12:35:50" as the individual access information AC in the email to the contact address of the service person, in such a manner that a touch operation (click operation) can be performed, for each date and time information. In the example illustrated in FIG. 10 and FIG. 12C, the access information adding unit P7 writes "http://ABC/DEF/001/20140801#12:35:50" as the individual access information AC in the email to the contact address of the sales person, in such a manner that a touch operation (click operation) can be performed, for each date and time information. In the example illustrated in FIG. 11 and FIG. 12D, the access information adding unit P7 writes "http://ABC/DEF/002/20140801#12:35:50" as the individual access information AC in the email to the contact address of the sales person's superior, in such a manner that a touch operation (click operation) can be performed, for each date and time information. In the example illustrated in FIG. 12 and FIG. 12E, the access information adding unit P7 writes "http://ABC/DEF/004/20140801#12:35:50" as the individual access information AC in the email to the contact address of the service person's superior, in such a manner that a touch operation (click operation) can be performed, for each date and time information.

More specifically, when the troubleshooting intention information WC is received from the contact address (in this example, the contact address indicated by the contact information CN(3)) corresponding to the access to the access information AC, the second transmission control unit P5 transmits the transmission information TD obtained by adding the troubleshooting intention information WC (in this example, written with a markup language, such as Hyper Text Markup Language (HTML), for describing the display screen of a web page) to the contact address (in this example, the contact address indicated by the contact information CN(3)) corresponding to the access.

When the troubleshooting intention information WC is received from the contact address (in this example, the contact address indicated by the contact information CN(3)) corresponding to the access to the access information AC, the second transmission control unit P5 simultaneously transmits the transmission information TD obtained by adding the troubleshooting intention information WC to the other contact addresses (in this example, the contact addresses indicated by the pieces of contact information CN(1), CN(2), and CN(4)) (with an email in this example).

Figure 13:
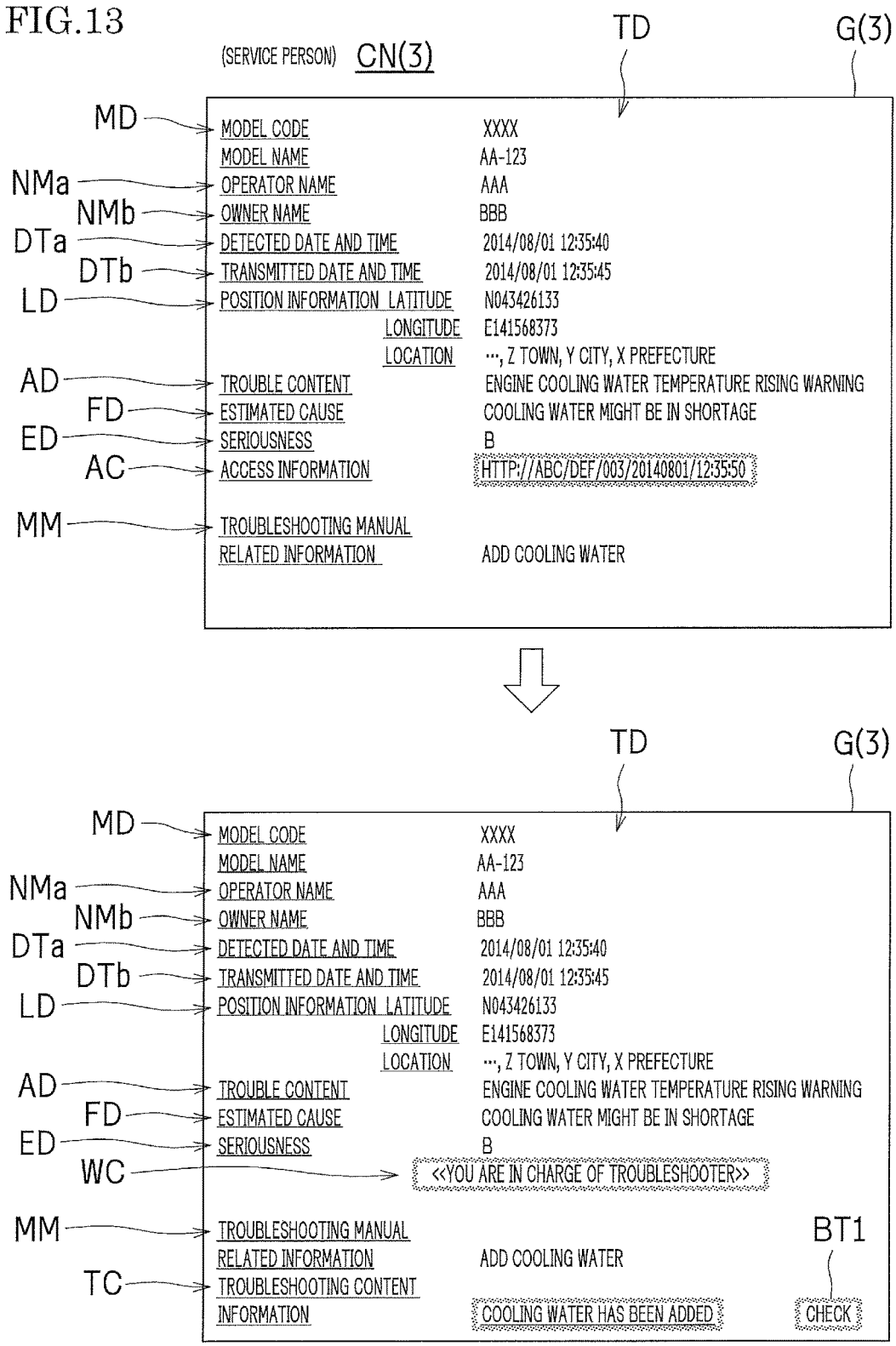
FIG. 13 is a plan view illustrating an example of a display mode on the display screen of the mobile terminal device displaying an email describing the access information illustrated in FIG. 9 (upper side) and a web page transmitted from the remote server to the contact address indicated by the contact information corresponding to the access to the access information (lower side).
Figure 14:
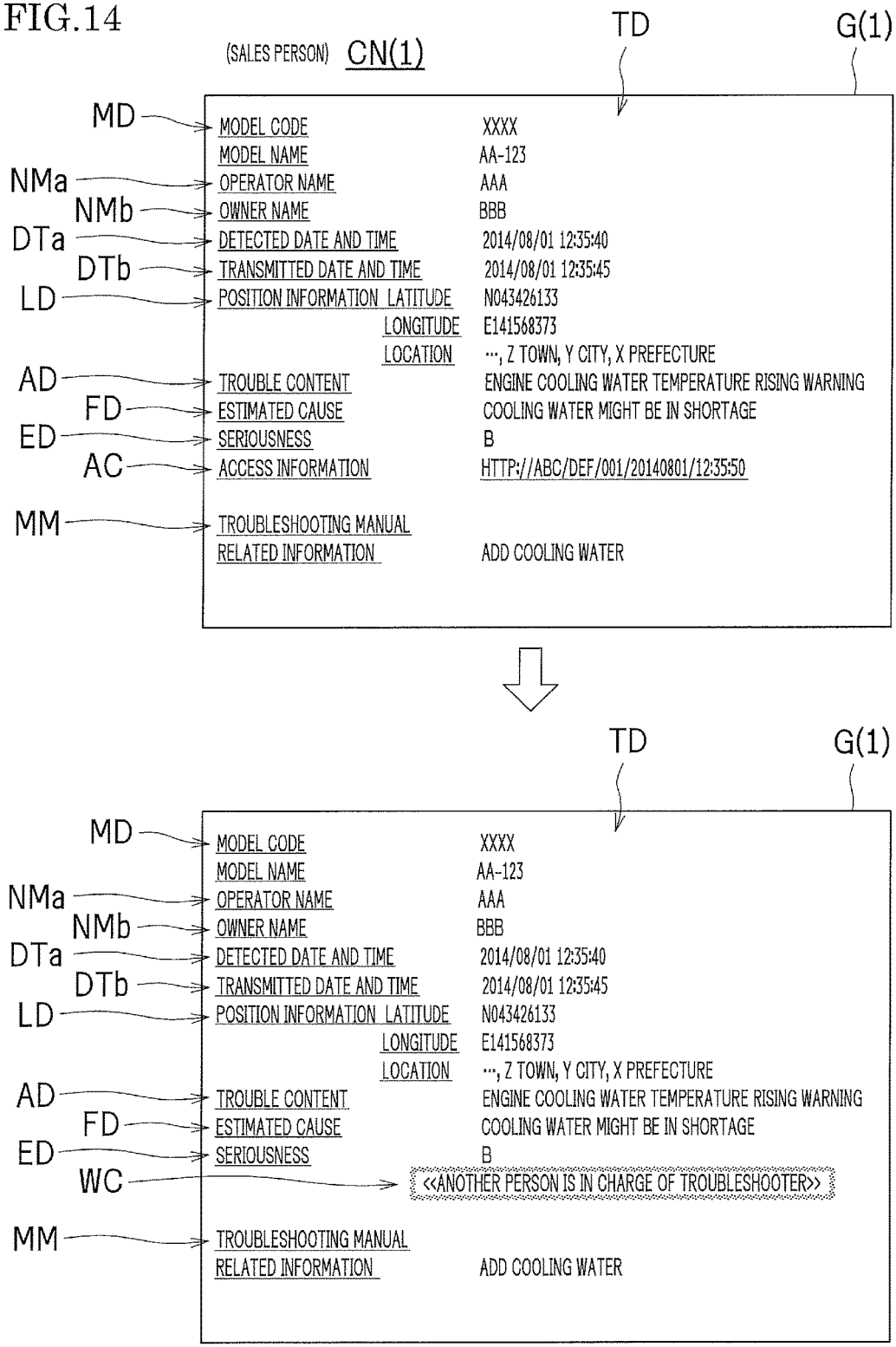
FIG. 14 is a plan view illustrating an example of a display mode on a corresponding one of the display screens of the mobile terminal device displaying the email describing the access information illustrated in FIG. 10 (upper side), and an email retransmitted from the remote server to the contact addresses indicated by a piece of contact information not corresponding to the access to the access information illustrated in FIG. 9 (lower side).
Figure 15:
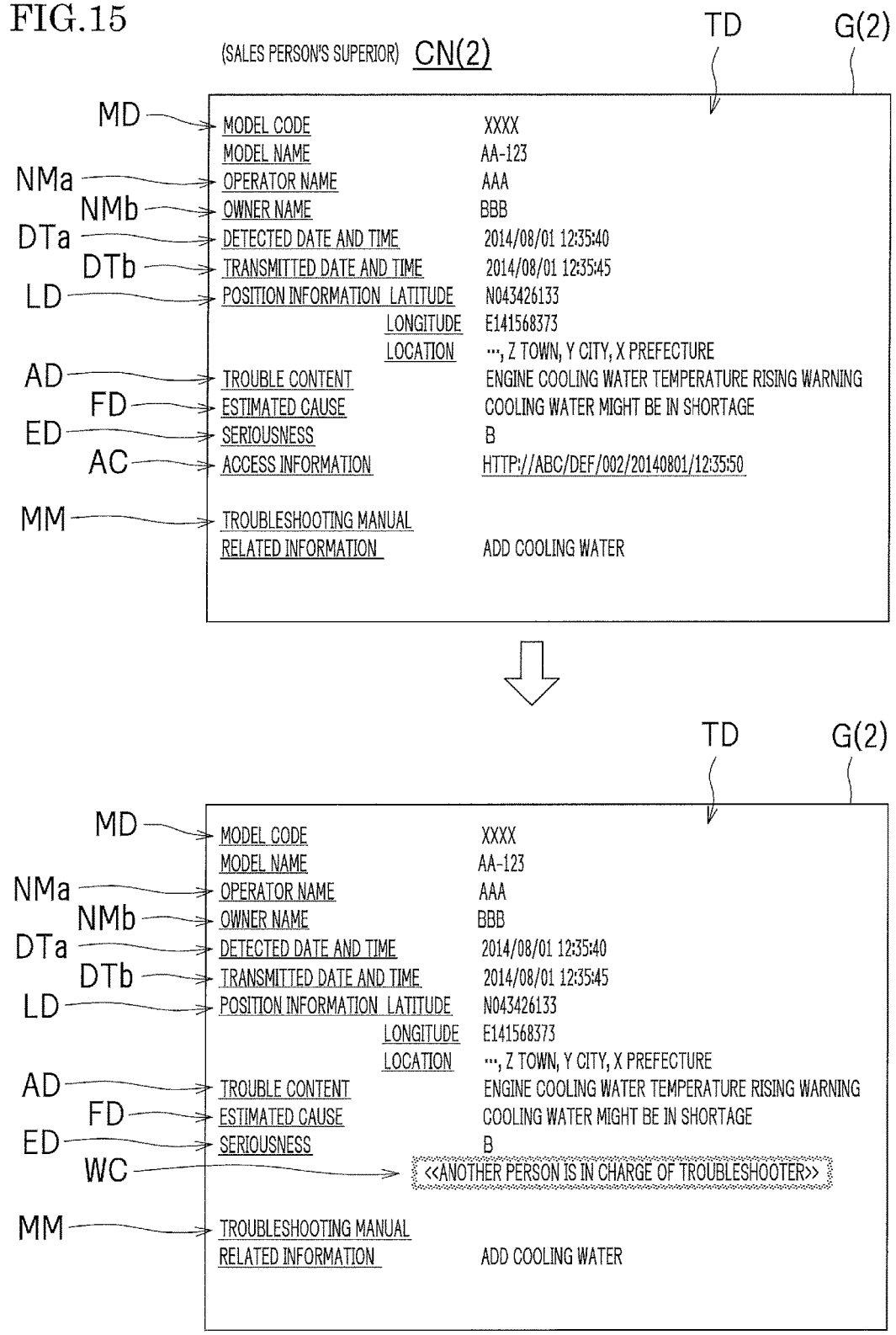
FIG. 15 is a plan view illustrating an example of a display mode on a corresponding one of the display screens of the mobile terminal device displaying the email describing the access information illustrated in FIG. 11 (upper side), and an email retransmitted from the remote server to the contact addresses indicated by a piece of contact information not corresponding to the access to the access information illustrated in FIG. 9 (lower side).
Figure 16:
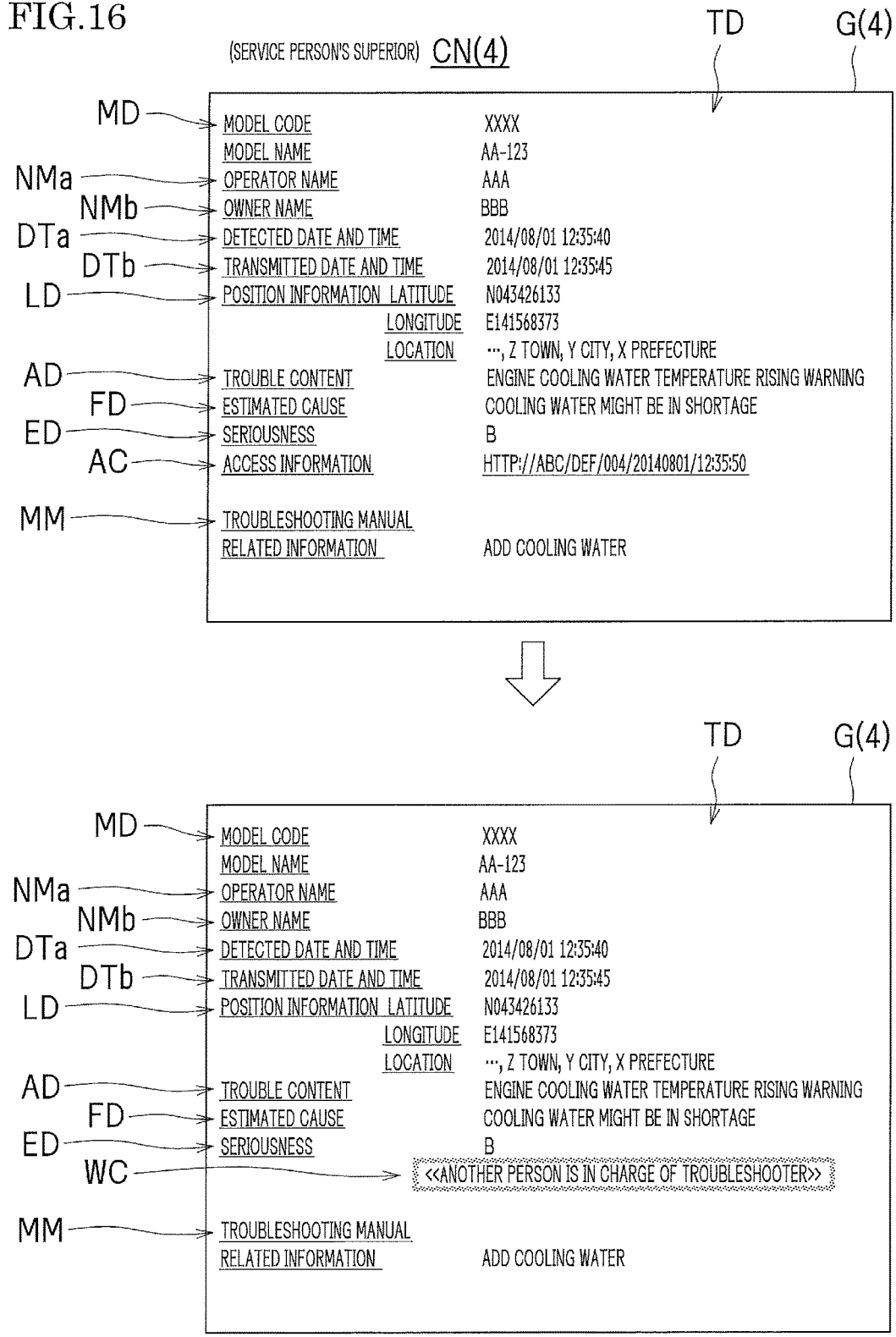
FIG. 16 is a plan view illustrating an example of a display mode on a corresponding one of the display screens of the mobile terminal device displaying the email describing the access information illustrated in FIG. 12 (upper side), and an email retransmitted from the remote server to the contact addresses indicated by a piece of contact information not corresponding to the access to the access information illustrated in FIG. 9 (lower side).

FIG. 13 is a plan view illustrating an example of a display mode on the display screen G(3) of the mobile terminal device 170 displaying an email describing the access information AC illustrated in FIG. 9 (upper side) and a web page transmitted from the remote server 130 to the contact address indicated by the contact information CN(3) corresponding to the access to the access information AC (lower side). FIG. 14 to FIG. 16 are each a plan view illustrating an example of a display mode on a corresponding one of the display screens G(1), G(2), and G(4) of the mobile terminal device 170 displaying the email describing the access information AC illustrated in FIG. 10 to FIG. 12 (upper side), and an email retransmitted from the remote server 130 to the contact addresses indicated by the pieces of contact information CN(1), CN(2), and CN(4) not corresponding to the access to the access information AC illustrated in FIG. 9 (lower side). In FIG. 12B to FIG. 12E, the display screens G(1) to G(4) of the mobile terminal device 170 after the access information AC has been accessed are omitted.

Upon receiving the troubleshooting intention information WC due to the access (touch operation) to the access information AC (more specifically, URL) from the one (in this example, the contact address of the service person indicated by the contact information CN(3)) of the contact addresses indicated by the plurality of pieces of contact information CN(1) to CN(4), the control unit 132 in the remote server 130 transmits the troubleshooting intention information WC as a predetermined message ("YOU ARE IN CHARGE OF TROUBLESHOOTER" in this example) indicating that the person is the troubleshooter, in the HTML format to the contact address (in this example, the contact address of the service person indicated by the contact information CN(3)) indicated by the contact information corresponding to the access. Then, the display screen G(3) of the mobile terminal device 170 with the contact address (in this example, the contact address of the service person indicated by the contact information CN(3)) indicated by the contact information corresponding to the access displays the troubleshooting intention information WC (see FIG. 13) as the message ("YOU ARE IN CHARGE OF TROUBLE-SHOOTER" in this example) indicating that the person is the troubleshooter, on the web page (see the lower side in FIG. 13).

Upon receiving the troubleshooting intention information WC due to the access (touch operation) to the access information AC (more specifically, URL) from the one (in this example, the contact address of the service person indicated by the contact information CN(3)) of the contact addresses indicated by the plurality of pieces of contact information CN(1) to CN(4), the control unit 132 in the remote server 130 transmits the troubleshooting intention information WC as an email, with a predetermined message ("ANOTHER PERSON IS IN CHARGE OF TROUBLE-SHOOTER" in this example) indicating that the other person is the troubleshooter in charge of the troubleshooting, to the contact addresses indicated by the other pieces of contact information (in this example, the contact address of the sales person indicated by the contact information CN(1), the contact address of the sales person's superior indicated by the contact information CN(2), and the contact address of the service person's superior indicated by the contact information CN(4)). Then, the display screens G(1), G(2), and G(4) (see FIG. 14 to FIG. 16) of the mobile terminal devices 170 with the contact addresses indicated by the other pieces of contact information (in this example, the contact address of the sales person indicated by the contact information CN(1), the contact address of the sales person's superior indicated by the contact information CN(2), and the contact address of the service person's superior indicated by the contact information CN(4)) display the troubleshooting intention information WC as the message ("ANOTHER PERSON IS IN CHARGE OF TROUBLESHOOTER" in this example) indicating that the other person is the troubleshooter in charge of the troubleshooting, on the email (see the lower side in FIG. 14 to FIG. 16).

In the present embodiment, the control unit 132 in the remote server 130 (see FIG. 5) further includes a first recognition unit P8 and a second recognition unit P9.

—First Recognition Unit—

The first recognition unit P8 recognizes person information NMc, indicating a person with one of the contact addresses indicated by the plurality of pieces of contact information CN(1) to CN(4) that corresponds to the accessed access information AC, as troubleshooter information indicating the troubleshooter in charge of the troubleshooting.

FIG. 17 is a schematic diagram illustrating a data structure of an example of a third database DB3 storing the person information NMc for each access information AC.

The third database DB3 is stored in the storage unit 134 (see FIG. 5). As illustrated in FIG. 17, in the third database DB3 in the storage unit 134, the person information NMc indicating a person with the contact address is stored in advance while being associated with the access information AC. The control unit 132 can recognize the person information NMc by referring to the third database DB3 in the storage unit 134 based on the access information AC.

As described above, the person with the contact address can be identified by using the person information NMc set (stored) while being associated with the access information AC. More specifically, the first recognition unit P8 can obtain the person information NMc acquired from the third database DB3 based on the URL.

In the present embodiment, with the individual access information AC (more specifically, URL) associated with the person information NMc in the third database DB3 (see FIG. 17) in the storage unit 134, the first recognition unit P8 of the control unit 132 can recognize the person information NMc (in this example, ○◆□) corresponding to the contact address matching the accessed access information AC (in this example, http://ABC/DEF/003/20140801#12:35:50) as the troubleshooter information.

In, the present embodiment, the troubleshooting intention information WC may be the troubleshooter information indicating the troubleshooter. The troubleshooter information may be the person information NMc indicating a person with one of the contact addresses indicated by the plurality of pieces of contact information CN(1) to CN(4) that is associated with the individual access information AC (more specifically, URL). In this case, the display screens G(1), G(2), and G(4) (see FIG. 14 to FIG. 16) of the mobile terminal devices 170 with the contact addresses indicated by the other pieces of contact information (in this example, the contact address of the sales person indicated by the contact information CN(1), the contact address of the sales person's superior indicated by the contact information CN(2), and the contact address of the service person's superior indicated by the contact information CN(4)) can display the person information NMc as the message corresponding to the troubleshooting intention information WC ("○◆□ is the troubleshooter" in this example) indicating that the other person is the troubleshooter in charge of the troubleshooting.

—Second Recognition Unit—

The second recognition unit P9 can recognize access start date and time information indicating the date and time when the access information AC (more specifically, URL) is accessed as troubleshooting start date and time information DTc (described later with reference to FIG. 19) that is date and time information indicating when the troubleshooting has started.

In the present embodiment, the control unit 132 in the remote server 130 (see FIG. 5) further includes a troubleshooting manual identifying unit P10 and a troubleshooting manual adding unit P11.

—Troubleshooting Manual Identifying Unit—

FIG. 18 is a schematic diagram illustrating a data structure of an example of a fourth database DB4 storing troubleshooting manual related information MM for each combination between the model information MD and the trouble content identification information CD.

As illustrated in FIG. 18, the troubleshooting manual identifying unit P10 identifies the troubleshooting manual related information MM for performing the troubleshooting for the content of the trouble, based on the model information MD and the trouble content identification information CD.

The fourth database DB4 is stored in the storage unit 134 (see FIG. 5). In the fourth database DB4 in the storage unit 134, the troubleshooting manual related information MM is stored in advance for each combination between the model information MD and the trouble content identification information CD. The control unit 132 can recognize the troubleshooting manual related information MM by referring to the fourth database DB4 in the storage unit 134 based on the model information MD and the trouble content identification information CD.

As described above, the troubleshooting information on the troubleshooting for the content of the trouble in the troubleshooting manual can be identified by using the troubleshooting manual related information MM set (stored) while being associated with the trouble content identification information CD. More specifically, the troubleshooting manual identifying unit P10 can acquire the troubleshooting information for performing the troubleshooting for the content of the trouble in the troubleshooting manual, from the troubleshooting manual related information MM acquired from the fourth database DB4 based on the trouble content identification information CD.

In the present embodiment, troubleshooting manual identifying unit P10 identifies the troubleshooting manual related information MM matching the model information MD and the trouble content identification information CD in the fourth database DB4 (see FIG. 18) in the storage unit 134.

The troubleshooting manual related information MM may be data on the troubleshooting information on the troubleshooting for the content of the trouble in the troubleshooting manual, or may be information (what is known as hyperlink information, more specifically, URL) indicating a reference location of the data on the troubleshooting information on the troubleshooting for the content of the trouble in the troubleshooting manual, depending on an information amount of the data on the troubleshooting information. FIG. 6 and FIG. 9 to FIG. 12, FIG. 12B to FIG. 12E, and FIG. 13 to FIG. 16, each illustrate an example of the data on the troubleshooting information on the troubleshooting for the content of the trouble in the troubleshooting manual. For example, the troubleshooting manual related information MM may be a URL. In such a case, a linked web page opens when the URL is clicked, and the troubleshooting information on the troubleshooting for the content of the trouble in the troubleshooting manual is displayed on the opened web page.

—Troubleshooting Manual Adding Unit—

The troubleshooting manual adding unit P11 adds the troubleshooting manual related information MM, identified by the troubleshooting manual identifying unit P10, to the transmission information TD (see FIG. 9 to FIG. 16). As a result, a text including the troubleshooting manual related information MM is displayed in FIG. 9 to FIG. 12, FIG. 12B to FIG. 12E, and FIG. 13 to FIG. 16.

In the present embodiment, the control unit 132 (see FIG. 5) in the remote server 130 further includes a simultaneous transmission repeating control unit P12.

—Simultaneous Transmission Repeating Control Unit—

The simultaneous transmission repeating control unit P12 repeats simultaneous transmission of the transmission information TD to the contact addresses indicated by the plurality of pieces of contact information CN(1) to CN(4), when the troubleshooting intention information WC is not received within a predetermined time period TI after the transmission of the transmission information TD, more specifically, when no one accesses (performs the touch operation on) the access information AC (see FIG. 9 to FIG. 12) on the display screens G(1) to G(4) of the mobile terminal devices 170 with the contact addresses indicated by the contact information CN(1) to CN(4).

In the present embodiment, the control unit 132 in the remote server 130 (see FIG. 5) further includes a second reception control unit P13 and an information accumulation control unit P14.

—Second Reception Control Unit—

FIG. 19 is a schematic diagram illustrating a data structure of an example of a fifth database DB5 storing the detected date and time information DTa, the transmitted date and time information DTb, the trouble content identification information CD, the troubleshooting start date and time information DTc, troubleshooting completed date and time information DTd, and troubleshooting content information TC for each combination between the model information MD and serial number information SR.

The second reception control unit P13 receives the troubleshooting intention information WC from the contact address corresponding to the access to the access information AC, and additionally receives troubleshooting content information TC indicating the content of the troubleshooting for the content of the trouble (see the lower side in FIG. 13 and FIG. 19).

—Information Accumulation Control Unit—

The information accumulation control unit P14 accumulates the troubleshooting content information TC, received by the second reception control unit P13, in the storage unit 134.

As illustrated in the lower side in FIG. 13, the display screen G(3) of the mobile terminal device 170 of the troubleshooter (the service person with the contact address indicated by the contact information CN(3) in this example) displays a web page on which the troubleshooting content information TC is displayed in such a manner that input reception operation can be performed.

More specifically, the web page on the lower side in FIG. 13 includes: an input field for the troubleshooting content information TC displayed in such a manner that an input operation can be performed; and a "register" button BT1, for confirming the registration, displayed close to the input field for the troubleshooting content information TC in such a manner that a touch operation can be performed.

In the web page on the lower side in FIG. 13, when the troubleshooter (in this example, the service person with the contact address indicated by the contact information CN(3)) inputs the troubleshooting content information TC (in this example, "added cooling water") and the touch operation is performed on the "register" button BT1, the second reception control unit P13 receives the troubleshooting content information TC, and the information accumulation control unit P14 accumulates and stores the troubleshooting content information TC and the troubleshooting completed date and time information DTd in the storage unit 134, together with the detected date and time information DTa, the transmitted date and time information DTb, the trouble content identification information CD, and the troubleshooting start date and time information DTc, for each combination between the model information MD and the serial number information SR as illustrated in FIG. 19. Here, the troubleshooting completed date and time information DTd indicates the data and time when the troubleshooting content information TC is registered, and the date and time when the troubleshooting is completed.

In the present embodiment, the control unit 132 (see FIG. 5) further includes a third identifying unit P15 and a reception check instruction adding unit P16.

—Third Identifying Unit—

FIG. 20 is a schematic diagram illustrating a data structure of an example of a sixth database DB6 storing operator contact information DN and owner contact information EN associated with the machine identification information SD.

As illustrated in FIG. 20, the third identifying unit P15 identifies the operator contact information DN and/or the owner contact information EN (both of the operator contact information DN and the owner contact information EN are identified in this example) based on the machine identification information SD.

The sixth database DB6 is stored in the storage unit 134 (see FIG. 5). In the sixth database DB6 in the storage unit 134, the operator contact information DN and the owner contact information EN are stored in advance while being associated with the machine identification information SD (the terminal phone number in the example illustrated in FIG. 20). The control unit 132 can recognize the operator contact information DN and the owner contact information EN by referring to the sixth database DB6 in the storage unit 134 based on the machine identification information SD.

As described above, the operator contact address and the owner contact address can be identified by using the operator contact information DN and the owner contact information EN set (stored) while being associated with the machine identification information SD. More specifically, the third identifying unit P15 can obtain the operator contact address and the owner contact address from the operator contact information DN and the owner contact information EN acquired from the sixth database DB6 based on the machine identification information SD.

In the present embodiment, the third identifying unit P15 identifies the operator contact information DN and the owner contact information EN matching the machine identification information SD in the sixth database DB6 (see FIG. 20) in the storage unit 134.

—Reception Check Instruction Adding Unit—

Figure 22:
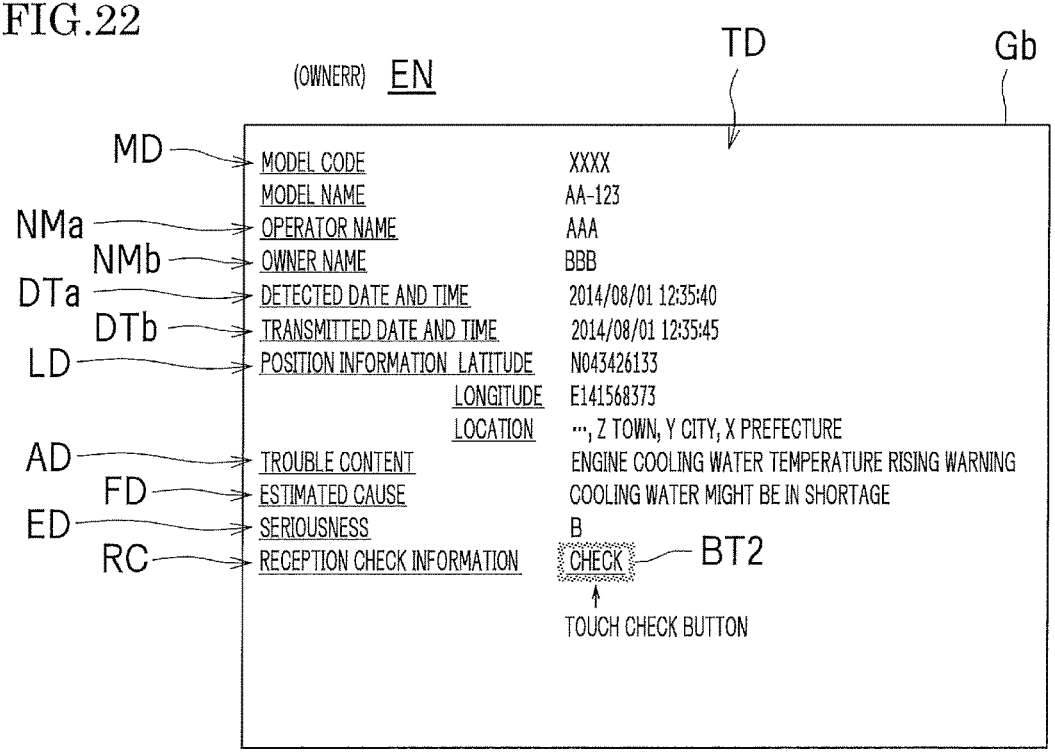
FIG. 22 is a plan view illustrating an example of display modes on a display screen of a mobile terminal device displaying an email transmitted from the remote server to the contact address of the owner contact information.

FIG. 21 and FIG. 22 are plan views illustrating an example of display modes on display screens Ga and Gb of the mobile terminal devices 170 displaying the email transmitted from the remote server 130 to the contact addresses of the operator contact information DN and the owner contact information EN.

As illustrated in FIG. 21 and FIG. 22, the reception check instruction adding unit P16 adds reception check information RC, instructing the reception check in the agricultural machine 110, to the transmission information TD to be transmitted to the contact address of the operator contact information DN and/or the owner contact information EN (in this example, both of the operator contact information DN and the owner contact information EN) identified by the third identifying unit P15. More specifically, the reception check instruction adding unit P16 adds the reception check information RC to the transmission information TD to be transmitted to the contact addresses of the operator contact information DN and the owner contact information EN identified by the third identifying unit P15, when the seriousness rank (in this example, B rank and C rank) is not the highest rank (in this example, A rank).

The display screens Ga and Gb of the mobile terminal device 170 with the contact addresses indicated by the operator contact information DN and the owner contact information EN identified by the third identifying unit P15 each displays an email including a text including the transmission information TD including the model information MD (the model code and the model name), the operator name information NMa (operator name), the owner name information NMb (owner name), the detected date and time information DTa (detected date and time), the transmitted date and time information DTb (transmitted date and time), the position information LD (latitude, longitude, and location), the trouble content information AD (content of the trouble), the estimated cause information FD (estimated cause), and the seriousness information ED (seriousness).

In the example illustrated in FIG. 21 and FIG. 22, the reception check instruction adding unit P16 writes the reception check information RC as a "check" button BT2 in such a manner than a touch operation (click operation) can be performed, in the email to the operator and the owner contact addresses.

More specifically, the email illustrated in FIG. 21 and FIG. 22 includes a "check" button BT2 on which a touch operation can be performed. A predetermined message ("TOUCH CHECK BUTTON" in this example) is displayed close to the "check" button BT2.

The remote server 130 can recognize that the email to each of the contact addresses indicated by the operator contact information DN and the owner contact information EN has been checked, when the reception check information RC is accessed by the operation on the "check" button BT2.

When the operator and the owner performs the touch operation on the "check" button BT2 in the emails illustrated in FIG. 21 and FIG. 22, the remote server 130 recognizes that the operator and the owner have checked the email.

(Control Operation in Troubleshooting System)

Figure 23:
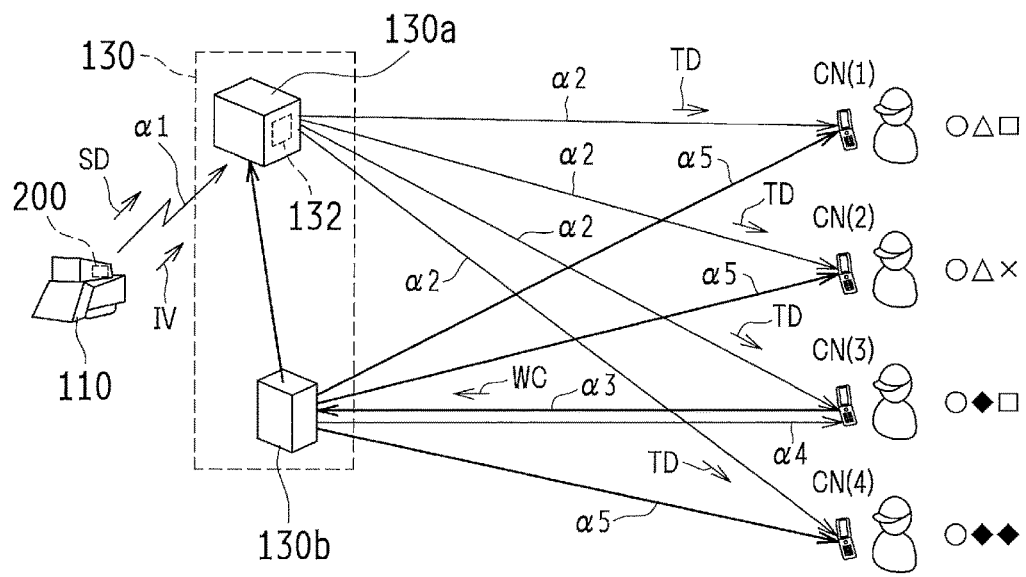
FIG. 23 is a diagram illustrating a flow of an example of control operation in a troubleshooting system according to the present embodiment.
Figure 24:
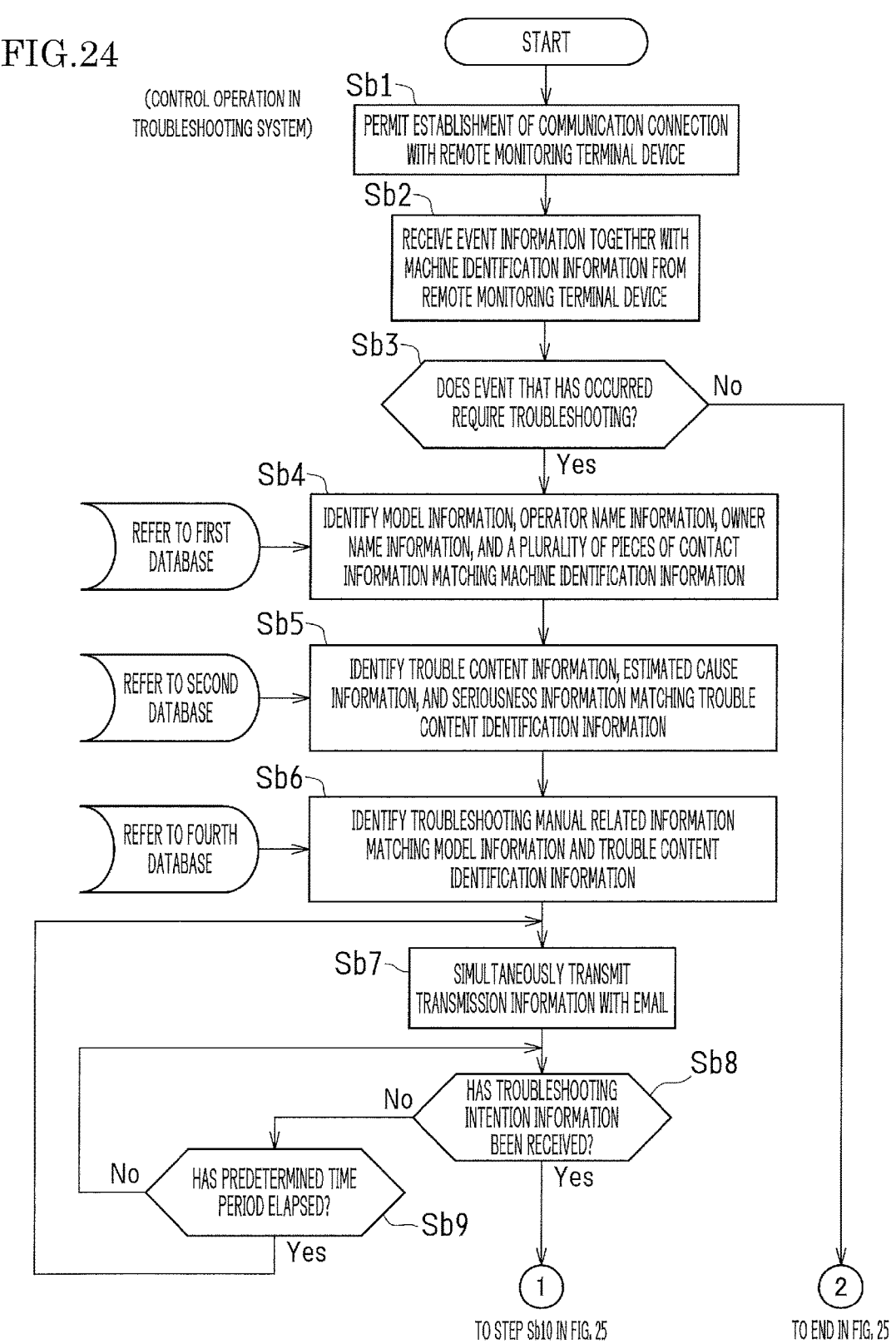
FIG. 24 is a flowchart illustrating the first half of the example of the control operation in the troubleshooting system according to the present embodiment.

FIG. 23 is a diagram illustrating a flow of an example of control operation in the troubleshooting system according to the present embodiment. FIG. 24 and FIG. 25 are flowcharts respectively illustrating the first half and the second half of the example of the control operation in the troubleshooting system according to the present embodiment. In the example illustrated in FIG. 23, the remote server 130 includes a main server 130a and a sub server 130b that can perform information communication with each other.

In the control operation in the troubleshooting system according to the present embodiment illustrated in FIG. 24 and FIG. 25, first of all, the control unit 132 in the remote server 130 (main server 130a) permits the establishment of the communication with the remote monitoring terminal device 200 of the agricultural machines 110, . . . when a communication connection request is received from the remote monitoring terminal device 200 in step Sa10 illustrated in FIG. 8 described above (step Sb1).

Then, the control unit 132 receives the event information IV together with the machine identification information SD from the remote monitoring terminal device 200 (step Sb2, see α1 in FIG. 23).

Then, the control unit 132 determines whether the event that has occurred in the agricultural machine 110 is event as a trouble such as failure, malfunctioning, or auto theft requiring troubleshooting (step Sb3). Thus, the event requiring troubleshooting can be identified in various events that may occur. For example, the control unit 132 determines that the troubleshooting is required for the event that has occurred when event identification information DIV is an error code indicating the content of the abnormality such as failure, is a warning with ON/OFF information (more specifically, contact point information indicating 0 or 1) from various sensors for detecting the operation state of the agricultural machine 110, or is an abnormality of numerical value data from the various sensors for detecting the operation state of the agricultural machine 110.

When the control unit 132 determines that the troubleshooting is required for the event in step Sb3 (step Sb3: Yes), the processing proceeds to step Sb4. On the other hand, when it is determined that no troubleshooting is required for the event (step Sb3: No), the processing is terminated. For example, the event requiring the troubleshooting is determined to have occurred when the event identification information DIV indicates that an error code indicating the content of an abnormality such as failure has been generated, that the warning with the ON/OFF information from the various sensors has been generated, or that the abnormality of the numerical value data from the various sensors has occurred.

Next, the control unit 132 identifies the model information MD, the operator name information NMa, the owner name information NMb, and the plurality of pieces of contact information CN(1) to CN(4) matching the machine identification information SD by using the first database DB1 (see FIG. 7) in the storage unit 134 (step Sb4).

Next, the control unit 132 identifies the trouble content information AD, the estimated cause information FD, and the seriousness information ED matching the trouble content identification information CD by using the second database DB2 (see FIG. 8) in the storage unit 134 (step Sb5).

Next, the control unit 132 identifies the troubleshooting manual related information MM matching the model information MD and the trouble content identification information CD by using the fourth database DB4 (see FIG. 18) in the storage unit 134 (step Sb6).

Next, the control unit 132 simultaneously transmits to the contact addresses indicated by the plurality of pieces of contact information CN(1) to CN(4) with an email, the transmission information TD including the model information MD, the operator name information NMa, the owner name information NMb, the detected date and time information DTa, the transmitted date and time information DTb, the position information LD, the trouble content information AD, the estimated cause information FD, the seriousness information ED, and the troubleshooting manual related information MM, as well as the access information AC (see FIG. 9 to FIG. 12 and FIG. 12B to FIG. 12E) (step Sb7, see α2 in FIG. 23). The control unit 132 further adds the instruction information AS (see FIG. 12B to FIG. 12E), for instructing a phone call to the operator and the owner, to the transmission information TD to be simultaneously transmitted to the contact addresses indicated by the plurality of pieces of contact information CN(1) to CN(4), when the seriousness information ED has the highest rank (in this example, the A rank indicating auto theft or the like).

Next, the control unit 132 determines whether the troubleshooting intention information WC has been received via the sub server 130b from one (the contact address indicated by the contact information CN(3) in this example) of the contact addresses indicated by the plurality of pieces of contact information CN(1) to CN(4) that corresponds to the access to the access information AC (in this example, http://ABC/DEF/003/20140801#12:35:50) (step Sb8). When the troubleshooting intention information WC is not received (step Sb8: No), the processing proceeds to step Sb9. When the troubleshooting intention information WC has been received (step Sb8: Yes, see α3 in FIG. 23), the processing proceeds to step Sb10 in FIG. 25.

In step Sb9, the control unit 132 determines whether a predetermined time period TI has elapsed. The processing proceeds to step Sb8 when the predetermined time period TI has not elapsed yet (step Sb9: No), and proceeds to step Sb7 when the predetermined time period TI has elapsed (step Sb9: Yes).

In step Sb7 to step Sb9, the control unit 132 simultaneously transmits the transmission information TD to the contact addresses indicated by the contact information CN(1) to CN(4) with an email, with the transmission information TD obtained by adding the model information MD, the operator name information NMa, the owner name information NMb, the detected date and time information DTa, the transmitted date and time information DTb, the position information LD, the trouble content information AD, the estimated cause information FD, and the seriousness information ED as well as the reception check information RC (see FIG. 21 and FIG. 22) to the contact addresses of the operator contact information DN and the owner contact information EN.

Next, when the access information AC (more specifically, URL) is accessed, as illustrated in FIG. 25, the control unit 132 transmits the troubleshooting intention information WC as the predetermined message indicating the designation as the troubleshooter to one (in this example, the contact address indicated by the contact information CN(3)) of the contact addresses indicated by the plurality of pieces of contact information CN(1) to CN(4) that corresponds to the access to the contact address via the sub server 130b (step Sb10, see α4 in FIG. 23). When the seriousness information ED has the highest rank (the A rank such as auto theft in this example), the side (the troubleshooter in particular) performing the maintenance on the agricultural machine 110 checks the instruction information AS and makes a phone call to the operator and the owner (see γ3 in FIG. 12A).

Next, the control unit 132 transmits the predetermined message indicating that the other person is the troubleshooter as the troubleshooting intention information WC to the other contact addresses (in this example, the contact addresses indicated by the contact information CN(1), CN(2), and CN(4)) (step Sb11, see α5 FIG. 23).

Next, the control unit 132 recognizes the troubleshooter information as the person information NMc (in this example, ○◆□) on the contact address corresponding to the accessed access information AC (in this example, http://ABC/DEF/003/20140801#12:35:50) by using the third database DB3 (see FIG. 17) in the storage unit 134 (step Sb12), and recognizes the troubleshooting start date and time information DTc as the access start date and time information indicating the time when the access information AC (more specifically, URL) is accessed (step Sb13).

Next, the control unit 132 receives the troubleshooting content information TC from the contact address (in this example, the contact address indicated by the contact information CN(3)) corresponding to the access to the access information AC (more specifically, URL) (step Sb14), and accumulates the troubleshooting content information TC and the troubleshooting completed date and time information DTd together with the detected date and time information DTa, the transmitted date and time information DTb, the troubleshooting start date and time information DTc, and the trouble content identification information CD in the storage unit 134 for each model information MD and serial number information SR (step Sb15, see FIG. 19). Then, the processing operation is terminated.

Effect of the Present Embodiment

The remote server 130 described above simultaneously transmits the transmission information TD to the contact addresses indicated by the plurality of pieces of contact information CN(1) to CN(n) (in this example, CN(1) to CN(4)). Thus, when there are a plurality of maintenance persons, the transmission information TD including the trouble content information AD is simultaneously transmitted to the persons with the contact addresses indicated by the plurality of pieces of contact information CN(1) to CN(4). Thus, when a trouble occurs in the agricultural machine 110, the maintenance person can quickly recognize the trouble that has occurred, and thus can quickly perform the troubleshooting for the trouble. When the seriousness information ED has the highest rank (the A rank such as auto theft in this example), the instruction information AS instructing a phone call to the operator and/or the owner (in this example, the operator and the owner) is added to the transmission information TD to be transmitted to the contact addresses indicated by the plurality of pieces of contact information CN(1) to CN(4). Thus, when the trouble with the highest rank in terms of seriousness (the trouble which may be auto theft for example) occurs, the instruction to make a phone call to the operator and/or the owner (in this example, the operator and the owner) of the agricultural machine 110 can be issued. Thus, the operator or the like of the moving body can be notified of information corresponding to the seriousness level of the trouble. Furthermore, primary troubleshooting can be performed with a higher responsiveness. In particular, the troubleshooter can ask the operator and/or owner (in this example, the operator and the owner) to quickly check the agricultural machine 110, when the content of the trouble may be indicative of auto theft. The transmission information TD includes the model information MD and the operator name information NMa and/or the owner name information NMb (in this example, the operator name information NMa and the owner name information NMb are included). Thus, the troubleshooter that performs the troubleshooting can not only easily recognize the agricultural machine 110 involving the trouble and its operator and/or owner (in this example, the operator and the owner) but can also quickly go to the location of the agricultural machine 110 involving the trouble because the transmission information TD further includes the position information LD. Furthermore, the troubleshooter can prepare a replacement part and a special tool as appropriate in advance, because the transmission information TD includes the trouble content information AD and the estimated cause information FD.

In the present embodiment, when the troubleshooting intention information WC is received from any one of the contact addresses indicated by the plurality of pieces of contact information CN(1) to CN(4), that is, the contact address indicated by the contact information CN(i) (in this example, CN(3)), the troubleshooting intention information WC is transmitted to the contact address indicated by the other pieces of contact information CN(1), CN(2), and CN(4). Thus, the persons with the contact addresses indicated by the plurality of pieces of contact information CN(1) to CN(4) can share the troubleshooting intention information WC. A fact that one of the persons with the contact addresses indicated by the plurality of pieces of contact information CN(1) to CN(4) has shown the intention to perform the troubleshooting can be informed to the other persons. Thus, when there are a plurality of maintenance persons, redundant troubleshooting by the plurality of maintenance persons can be effectively prevented.

In the present embodiment, the individual access information AC (in this example, URL) for accessing the remote server 130 is generated for each of a plurality of contact addresses and date and time information, and the individual access information AC is added to the transmission information TD. Thus, even when a trouble occurs for a plurality of times in a day, the persons with the contact addresses indicated by the plurality of pieces of contact information CN(1) to CN(4) can perform time based identification in the transmission information TD, including the trouble content information AD, which is on the day by day basis. The reception of the troubleshooting intention information WC corresponds to the access via the individual access information AC (in this example, URL). Thus, an operation in the agricultural machine 110 can be made simple (in this example, a button operation known as a click operation on the display screen of the mobile terminal device 170). The remote server 130 recognizes the troubleshooter information as the person information on one of the contact addresses indicated by the plurality of pieces of contact information CN(1) to CN(4) that corresponds to the accessed access information AC. Thus, one of the persons with the contact addresses indicated by the plurality of pieces of contact information CN(1) to CN(4) as the troubleshooter can be informed to the persons other than the troubleshooter via the remote server 130. The remote server 130 recognizes the access start date and time information as the date and time information indicating when the troubleshooting has started, and thus can identify the troubleshooting start date and time.

In the present embodiment, the troubleshooting intention information WC includes the person information NMc as the troubleshooter information on one of the contact addresses indicated by the plurality of pieces of contact information CN(1) to CN(4) corresponding to the individual access information AC. Thus, one of the persons with the contact addresses indicated by the plurality of pieces of contact information CN(1) to CN(4) as the troubleshooter can be informed to the persons other than the troubleshooter.

In the present embodiment, the troubleshooting manual related information MM is identified based on the model information MD and the trouble content identification information CD, and the troubleshooting manual related information MM thus identified is added to the transmission information TD. Thus, the troubleshooting suitable for the trouble can be recognized in advance. Thus, the persons with the contact addresses indicated by the plurality of pieces of contact information CN(1) to CN(4) can each determine whether he or she will be the troubleshooter for the trouble based on the troubleshooting suitable for the trouble (for example, determine whether he or she has a capability to perform the troubleshooting).

In the present embodiment, the simultaneous transmission of the transmission information TD to the contact addresses indicated by the plurality of pieces of contact information CN(1) to CN(4) is repeated when the troubleshooting intention information WC is not received within the predetermined time period TI after the transmission of the transmission information TD. Thus, the transmission information TD including the trouble content information AD can be effectively prevented from being unrecognized with the contact addresses indicated by the plurality of pieces of contact information CN(1) to CN(4), whereby the failure to perform the troubleshooting can be effectively prevented.

In the present embodiment, the troubleshooting intention information WC is received from any one of the contact addresses and the troubleshooting content information TC is further received and accumulated. Thus, a history of the troubleshooting content information TC indicating the troubleshooting for the content of the trouble can be easily managed. Thus, for example, the failure to perform the troubleshooting can be effectively prevented.

In the present embodiment, the operator contact information DN and/or the owner contact information EN (in this example, the contact information DN and the contact information EN) is identified based on the unique machine identification information SD. The transmission information TD is transmitted to the contact addresses indicated by the operator contact information DN and/or the owner contact information EN (in this example, the contact information DN and the contact information EN). Thus, the operator and/or the owner (in this example, the operator and the owner) can be notified of the content of the trouble, so that the operator and/or the owner (in this example, the operator and the owner) can recognize the content of the trouble. When the seriousness rank (in this example, the B rank or the C rank) is not the highest rank (in this example, the A rank), the reception check information RC instructing the reception check in the agricultural machine 110 is added to the transmission information TD. Thus, the remote server 130 can recognize that the operator and/or the owner (in this example, the operator and the owner) has checked the transmission information TD.

Other Embodiments

The remote monitoring system 100 according to the present embodiment is applied to a traveling work machine such as a combine harvester, a tiller, and a rice-trans planter. However, this should not be construed in a limiting sense, and the remote monitoring system 100 can be suitably applied also to a traveling work machine such as a construction machine including a tractor, an excavator, a wheel loader, and a carrier, and also to a vessel such as a pleasure boat and a fishing boat.

The present invention is not limited to the embodiment described above, and can be implemented in other various forms. Thus, the embodiment is exemplary in every respect, and should not be construed as limiting. The scope of the present invention is defined by claims, and is not limited in any way by the description in the specification. The scope of the present invention encompasses any change and modification within a scope equivalent to the scope of claims.

The present application claims priority based on Patent Application No. 2014-206685 filed in Japan on Oct. 7, 2014, the content of which is herein incorporated by reference.

INDUSTRIAL APPLICABILITY

The present invention relates to a remote server that receives from a work machine, position information indicating a position of the work machine, trouble content identification information indicating a content of trouble in the work machine, and detected date and time information indicating date and time when the trouble has been detected and/or transmitted date and time information indicating date and time when information has been transmitted from the work machine, together with unique identification information of the work machine, and can be applied to a configuration in which an operator or the like of a moving body is notified of information corresponding to the seriousness of the trouble.

REFERENCE SIGNS LIST

100 Remote monitoring system
110 Agricultural machine
120 Remote monitoring center
130 Remote server
130a Main server
130b Sub server 131 Communication unit
132 Control unit
133 Processing unit
134 Storage unit
140 Communication network
150 Network
160 Fixed terminal device
161 Control unit
170 Mobile terminal device
171 Control unit
200 Remote monitoring terminal device
210 Communication unit
220 Power source control unit
231 GPS sensor
232 Position detection unit
233 Information storage unit
240 Control unit
241 Event information transmission control unit
250 Processing unit
260 Storage unit
AC Access information
AD Trouble content information
AS Instruction information
BT1 "Register" button
BT2 "Check" button
CD Trouble content identification information
CN Contact information
DB1 First database
DB2 Second database
DB3 Third database
DB4 Fourth database
DB5 Fifth database
DB6 Sixth database
DIV Event identification information
DN Operator contact information
DTa Detected date and time information
DTb Transmitted date and time information
DTc Troubleshooting start date and time information
DTd Troubleshooting completed date and time information
ED Seriousness information
EN Owner contact information
FD Estimated cause information
G Display screen
Ga Display screen
Gb Display screen
IV Event information
LD Position information
MD Model information
MM Troubleshooting manual related information
NMa Operator name information
NMb Owner name information
NMc Person information on contact address
P1 First reception control unit
P2 First identifying unit
P3 Second identifying unit
P4 First transmission control unit
P5 Second transmission control unit
P6 Access information generating unit
P7 Access information adding unit
P8 First recognition unit
P9 Second recognition unit
P10 Troubleshooting manual identifying unit
P11 Troubleshooting manual adding unit
P12 Simultaneous transmission repeating control unit
P13 Second reception control unit
P14 Information accumulation control unit
P15 Third identifying unit
P16 Reception check instruction adding unit
RC Reception check information
SD Machine identification information
SR Serial number information
TC Troubleshooting content information
TD Transmission information
TI Predetermined time period
WC Troubleshooting intention information

The invention claimed is:

1. A remote server that receives from a work machine, position information indicating a position of the work machine, trouble content identification information indicating a content of trouble in the work machine, and detected date and time information indicating date and time when the trouble has been detected and/or transmitted date and time information indicating date and time when information has been transmitted from the work machine, together with unique identification information of the work machine,
wherein based on the unique identification information, model information indicating a model of the work machine, operator name information indicating a name of an operator of the work machine and/or owner name information indicating a name of an owner of the work machine, and a plurality of pieces of contact information each indicating a corresponding one of a plurality of contact addresses of an entity in charge of maintenance for the work machine are identified,
wherein based on the trouble content identification information, trouble content information indicating the content of the trouble, estimated cause information indicating an estimated cause of the content of the trouble, and seriousness information indicating seriousness of the content of the trouble are identified,
wherein transmission information is simultaneously transmitted to the contact addresses indicated by the plurality of pieces of contact information identified, the transmission information including the model information, the operator name information and/or the owner name information, the detected date and time information and/or the transmitted date and time information, the position information, the trouble content information, the estimated cause information, and the seriousness information, and
wherein when the seriousness information has a highest rank, instruction information instructing a phone call to the operator and/or the owner is added to the transmission information to be transmitted to the contact addresses indicated by the plurality of pieces of contact information.

2. The remote server according to claim 1,
wherein based on the unique identification information, contact information on the operator and/or contact information on the owner is identified, and
wherein when the seriousness rank does not have the highest rank, reception check information is added to the transmission information to be transmitted to a contact address indicated by the contact information on the operator and/or the contact information on the owner, the reception check information instructing reception check in the work machine.

* * * * *